US008373691B2

(12) United States Patent
Sakamoto et al.

(10) Patent No.: US 8,373,691 B2
(45) Date of Patent: Feb. 12, 2013

(54) ACTIVE-MATRIX BISTABLE DISPLAY DEVICE

(75) Inventors: Michiaki Sakamoto, Kanagawa (JP); Yuji Kondo, Kanagawa (JP); Nobuaki Honbo, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/179,123

(22) Filed: Jul. 8, 2011

(65) Prior Publication Data

US 2011/0267333 A1 Nov. 3, 2011

Related U.S. Application Data

(62) Division of application No. 11/391,446, filed on Mar. 29, 2006, now Pat. No. 8,004,490.

(30) Foreign Application Priority Data

Mar. 31, 2005 (JP) ................................ 2005-101750

(51) Int. Cl.
*G09G 5/00* (2006.01)
*G06F 3/038* (2006.01)

(52) U.S. Cl. ............ 345/204; 345/76; 345/87; 345/103

(58) Field of Classification Search ............ 345/87–100, 345/105–108

See application file for complete search history.

(56) References Cited

U.S. PATENT DOCUMENTS

| | | | | |
|---|---|---|---|---|
| 5,796,391 A * | 8/1998 | Chiu et al. | | 345/204 |
| 5,856,816 A * | 1/1999 | Youn | | 345/98 |
| 2001/0012080 A1* | 8/2001 | Barberi et al. | | 349/123 |
| 2002/0021266 A1 | 2/2002 | Koyama et al. | | |
| 2004/0207578 A1* | 10/2004 | Koyama | | 345/76 |
| 2005/0051774 A1 | 3/2005 | Koyama et al. | | |
| 2005/0140633 A1* | 6/2005 | Kato | | 345/96 |
| 2006/0291032 A1* | 12/2006 | Zhou et al. | | 359/296 |

FOREIGN PATENT DOCUMENTS

| | | | |
|---|---|---|---|
| JP | 62-293297 U | | 12/1987 |
| JP | 3-38689 A | | 2/1991 |
| JP | 4-360127 A | | 12/1992 |
| JP | 06-308454 A | | 11/1994 |
| JP | 06308454 A | * | 11/1994 |

(Continued)

OTHER PUBLICATIONS

T. Whitesides, et al.; "10.2: Towards Video-rate Microencapsulated Dual-Particle Electrophoretic Displays"; SID (Society of Information Display) 04 Digest; p. 133. Next Generation Liquid Crystal Display; Kyoritsu Publishing Co.; p. 57.

Next Generation Liquid Crystal Display; Kyoritsu Publishing Co.; p. 1.

*Primary Examiner* — Viet Pham

(74) *Attorney, Agent, or Firm* — Sughrue Mion, PLLC

(57) ABSTRACT

An active-matrix bistable display panel is provided in which a pixel electrode is formed at each intersection of each of a plurality of scanning lines in a row direction and each of a plurality of signal lines in a column direction and a display state is made to occur depending on a voltage of each of the pixel electrodes, a signal-line driving unit is provided in which the plurality of signal lines is connected to a plurality of terminals and image inputs are sequentially divided into a plurality of image inputs and a plurality of image signals are supplied sequentially to the plurality of terminals in a time-division manner, and a scanning-line driving unit is provided in which each scanning line making up the plurality of groups is sequentially driven for each of the groups, wherein each of TFTs (Thin Film Transistors) is made active so as to supply an image voltage to each of pixel electrodes.

8 Claims, 19 Drawing Sheets

FOREIGN PATENT DOCUMENTS

| | | | |
|---|---|---|---|
| JP | 11-344724 | A | 12/1999 |
| JP | 2001-273785 | A | 10/2001 |
| JP | 2002-40391 | A | 2/2002 |
| JP | 2004-102054 | A | 4/2004 |
| KR | 2001-0020199 | A | 3/2001 |
| KR | 2003-0027797 | A | 4/2003 |
| WO | 2004/066251 | A1 | 8/2004 |

* cited by examiner

ACTIVE-MATRIX BISTABLE DISPLAY DEVICE

CROSS-REFERENCE TO RELATED APPLICATION

This application is a divisional of U.S. patent application Ser. No. 11/391,446 filed Mar. 29, 2006, which is based upon and claims the benefit of priority from Japanese Patent Application No. 2005-101750, filed Mar. 31, 2005, the contents of all of which are incorporated herein by reference in their entirety.

BACKGROUND OF THE INVENTION

1. Field of the Invention

The present invention relates to an active-matrix bistable display device capable of reducing the number of signal line amplifiers (H (horizontal) drivers).

The present application claims priority of Japanese Patent Application No. 2005-101750 filed on Mar. 31, 2005, which is hereby incorporated by reference.

2. Description of the Related Art

In recent years, a bistable display device is being developed as a device to be used in a display section or a like of electronic papers, public displays, and ICs (Integrated Circuit). The bistable display is used mainly as a reflective display device which has a characteristic in that reduction of power consumption can be achieved easily since an image signal is input only at time of display rewriting and the image signal is not input at a time of no rewriting.

Examples of the bistable display device include an electrophoretic display device (EDP) [see Non-Patent Reference 1: SID (Society of Information Display) 04, Digest p. 133], polymer network liquid crystal display (see Non-Patent Reference 2: Next Generation Liquid Crystal Display, Kyoritsu Publishing Co., p. 57), and bistable nematic liquid crystal display device (see Non-Patent Reference 3: Next Generation Liquid Crystal Display, Kyoritsu Publishing Co., p. 1), or a like. Of these display devices, the electrophoretic display device is assumed to be most promising since it has a simplified-structure and can be fabricated at low costs and consumes less power and is excellent in stability of displaying.

The electrophoretic display device is so configured that a transparent surface plate having a facing electrode made up of transparent conductive films in its inner face and pixel electrode plates in which pixel electrodes are arranged in a row direction and in a column direction are placed at a short interval and a toner powder obtained by mixing two kinds of charged particles each having a different polarity is hermetically sealed in gap space between the surface plate and each of the pixel electrode plates.

In such the electrophoretic display device as above, ordinarily, when a pixel electrode is made to be at a plus (+) potential by making a facing electrode be at a 0 (zero) potential and by controlling a voltage to be applied to a pixel electrode, black particles each having a positively-charged polarity are attracted toward the facing electrode side and white particles each having a negatively-charged polarity are attracted toward the pixel electrode side and, as a result, black is displayed through a transparent surface plate, whereas, when a pixel electrode is made to be at a minus (−) potential, white particles are attracted toward the facing electrode side and black particles are attracted toward the pixel electrode side and, as a result, white is displayed on the surface plate side. Thus, by controlling a polarity of a voltage to be applied to every pixel electrode, a character, image, or a like can be displayed.

Some of the electrophoretic display devices are so constructed that positively-charged black particles and negatively-charged white particles are sealed hermetically in a micro capsule and so as to have a film shape. In the case of this type of electrophoretic display device, to display black, when a voltage is applied, the black particles in the micro capsule are attracted toward a facing electrode and the white particles in the micro capsule are attracted toward a pixel electrode, whereas, to display white, when a voltage is applied, the white particles in the micro capsules are attracted toward the facing electrode and the black particles in the micro capsule are attracted toward the pixel electrode and, as a result, a character and/or image are displayed as in the case described above.

FIG. 18 is a graph for showing an example of a display characteristic of the electrophoretic display device. In any type of the electrophoretic display device, a concentration of black becomes high as a plus (+) voltage to be applied to a pixel electrode becomes high and a concentration of white becomes high, as a minus (−) voltage to be applied to a pixel electrode becomes high and, in either direction, as a voltage becomes high, a concentration comes near to a saturated state (100%) and becomes stable, which provides bistability in displaying. Such the distribution state of black and white is held even when a voltage of a pixel electrode is 0 (zero) V or the pixel electrode is opened, which provides memory property in displaying.

Moreover, pixel electrodes have a plurality of scanning lines extending in a row direction and a plurality of signal lines extending in a column direction in its lower location and have a TFT (Thin Film Transistor) substrate made up of TFT transistors in which a driving transistor is formed at each intersection of each of the scanning lines and each of the signal lines. Each of the pixel electrodes is of an active-matrix type in which, when a corresponding scanning line is driven, each of the TFTs becomes active, resulting in each of the pixel electrodes being connected to a corresponding signal line and a voltage of the signal line being applied to each of the pixel electrodes.

FIG. 19 is a schematic diagram showing configurations of a display panel used when a display section of a conventional electrophoretic display device is driven in a active mode. In the conventional electrophoretic display device, as shown in FIG. 19, a plurality of signal lines D1, D2, . . . , Dn, Dn+1, . . . extending in a column direction and a plurality of scanning lines G1, G2, . . . , Gm, Gm+1, . . . extending in a direction orthogonal to the column direction are provided and each of TFTs [(T1.1, T2.1, . . . , Tn.1, T(n+1).1, . . . ), (T1.2, T2.2, . . . , Tn.2, T(n+1).2, . . . ), (T1.*m*, T2.*m*, . . . , Tn.m, T(n+1).m, . . . ), (T1.(*m*+1), T2.(*m*+1), . . . , Tn.(m+1), T(n+1).(m+1), . . . ), . . . ], which are made of amorphous silicon (a-Si) or a like, is formed at each intersection of each of the signal lines D1, D2, . . . , Dn, Dn+1, . . . and each of the scanning lines G1, G2, . . . , Gm, Gm+1, . . . and, when driving of each of the signal lines coincides with that of each of the scanning lines, each of the TFTs connected at each intersection of each of the signal lines and each of the scanning lines becomes active and switching is done so that a voltage of each of the signal lines is applied to each of pixel capacitors [C1.1, C2.1, . . . , Cn.1, C(n+1).1, . . . ), (C1.2, C2.2, . . . , Cn.2, C(n+1).2, . . . ), (C1.*m*, C2.*m*, . . . , Cn.m, C(n+1).m, . . . ), (C1.(*m*+1), C2.(*m*+1), . . . Cn.(m+1), C(n+1).(m+1) . . . ].

Each of the pixel capacitors represents the capacitor formed between each of the pixel electrodes connected to each of corresponding TFTs shown in an upper portion in FIG. 5 and a facing electrode (not shown) whose connecting state is indicated by each of circular marks shown in a lower portion in FIG. 5.

FIGS. 20A and 20B show a difference in driving methods between an ordinary liquid crystal display device and a bistable display device. In each of the ordinary liquid crystal display devices, as shown in FIG. 20A, when a scanning signal is at an ON voltage by a scanning signal applied to each of scanning lines and an image signal input to each of the signal lines, a corresponding TFT is turned ON and the image signal of each of the signal lines is written to each of pixel capacitors and, after the scanning signal is turned OFF, the image signal is held in each of the pixel capacitors for one frame and, as a result, an image is displayed. Then, after the operation of displaying an image has been complete, by lowering a voltage of the signal line, the image being displayed is erased.

On the other hand, the bistable display device generally provides a response speed of as slow as about 100 ms to 1000 ms and has a memory property (image holding property). Therefore, for example, presuming that one frame is 1/60 sec., as shown in FIG. 20B, ordinarily, after the same voltages are applied for writing in a plurality of frames during an image signal writing period, during an image holding period, no voltage is applied or the voltage is made to be 0V. Then, at time of termination of the image holding period, by applying a voltage of opposite polarity during an image erasing period made up of the plurality of frame periods, an image that had been displayed is erased.

In the bistable display device, unlike in the case of the ordinary liquid crystal display, generally requires no highly-accurate gap control, however, since a distance between a pixel electrode and a facing electrode is large, it is necessary that an image signal voltage at time of writing is made higher. In the bistable display device having a film structure in particular, a thickness of a film is about 100 μm which is considerably long when compared with the case of the liquid crystal display and, as a result, the distance between the pixel electrode and facing electrode is large and it is, therefore, necessary that an image signal voltage at time of writing driving is higher. Due to this, there is a problem that a signal line driver (H (horizontal) driver) to drive a signal line requires a highly withstand process and it is necessary that a data register, latch, D/A (digital to analog) converter or a like are built into the signal line driver, which causes costs for manufacturing the signal line driver to become higher when compared with a scanning driver (V (vertical) driver) made up of only shift registers.

To solve this problem, in order to reduce the number of horizontal drivers in the active-matrix display device, a double-speed driving method is disclosed in Patent Reference 1 (Japanese Patent Application No. Hei03-038689) and Patent Reference 2 (Japanese Patent Application No. Hei04-360127) in which the number of scanning lines is doubled and the number of signal lines is reduced to one-half. In this case, by connecting two pieces of pixels to each signal line through each TFT and gates of two pieces of TFTs to each of different scanning lines, selection of signals to be applied for writing to the two pieces of pixels is made possible. Therefore, for example, in the case of a VGA (Video Graphics Array)-type liquid crystal display, the number of scanning lines is increased to be 480×2=960, however, the number of signal lines is decreased to be 1920/2=960. By configuring as above, when compared with the conventional display device, though the number of vertical drivers increases, the number of highly-priced horizontal drivers decreases, thus enabling reduction of costs of manufacturing the active-matrix display device. However, the technologies disclosed in the Patent References 1 and 2 are to be applied to the ordinary liquid crystal display device providing no bistability and cannot be applied to the bistable display device of the present invention.

A display device using a cholesteric liquid crystal is disclosed as a bistable display device in the Patent Reference 3. It is known that the cholesteric liquid crystal display device, though differing in its characteristics from the electrophoretic display device, provides bistability for displaying. However, the technology disclosed in the Patent Reference 3 is to be applied to a passive-matrix display device providing no bistability for displaying and cannot be applied to the bistable display device of the present invention.

Thus, it is not conventionally known that configurations in which the number of highly-priced horizontal drivers can be reduced in the active-matrix bistable display device.

SUMMARY OF THE INVENTION

In view of the above, it is an object of the present invention to provide an active-matrix bistable display device in which the number of highly-priced horizontal drivers can be reduced.

According to a first aspect of the present invention, there is provided an active-matrix bistable display device including:

a bistable display panel in which a pixel electrode is formed at each intersection of each of N pieces (N is an integer being two or more) of scanning lines extending in a row direction and each of M pieces (M is an integer being two or more) of signal lines extending in a column direction and a display state that changes by pixel electrode is made to occur depending on a voltage of each of the pixel electrodes applied to a facing electrode;

a signal-line driving unit in which the M pieces of the signal lines are sequentially divided into M/X pieces (M/X is an integer being two or more) of signal line groups each including X pieces (X is an integer being two or more) of the signal lines and signal line groups are connected to M/X pieces of terminals in a one-to-one relationship and image inputs corresponding to the M pieces of signal lines are sequentially divided into M/X pieces of image input groups each including X pieces of image inputs and X pieces of image signals making up each image input group are supplied sequentially to the M/X pieces of the terminals in a time-division manner; and a scanning-line driving unit in which the N pieces of the scanning lines are sequentially divided into N/X pieces of scanning lines groups each including X pieces of the scanning lines, and the X pieces of the scanning lines are sequentially driven in each the scanning lines groups;

wherein each of switching elements connected between each of the corresponding signal lines and each of the corresponding pixel electrodes is made active in response to driving of each of the scanning lines so as to supply an image voltage fed from each signal line to each of the pixel electrodes so that bistable display by pixel in the display panel is performed according to a polarity of the image voltage.

In the foregoing first aspect, a preferable mode is one wherein the signal-line driving unit includes:

a distributing unit to distribute the image inputs corresponding to the M pieces of the signal lines into the M/X pieces of the terminals; and M/X pieces of signal drivers to sequentially output each of the X pieces of the image signals fed from the distributing unit to each of the terminals in a time-division manner.

Also, a preferable mode is one wherein the scanning-line driving unit includes X pieces of rows of shift registers to sequentially output signals of N/X pieces of the scanning lines obtained by dividing the N pieces of the scanning lines, wherein a stage corresponding to each row of shift registers sequentially drives the N/X pieces of the scanning lines with delay by a time-division period of the image signal in each of the terminals connected respectively to the signal lines.

Also, a preferable mode is one wherein the signal lines, scanning lines, and switching elements are placed in a lower portion of each of the pixel electrodes relative to the facing electrode.

According to a second aspect of the present invention, there is provided an active-matrix bistable display device including:

a bistable display panel having n pieces (n is an integer being two or more) of scanning lines extending in a row direction, n pieces of parity line groups each including X pieces (X is an integer being two or more) of parity lines extending in a row direction, corresponding to each of the n pieces of the scanning lines, M pieces (M is an integer being two or more) of signal lines extending in a column direction wherein a pixel electrode is formed at each intersection between of each of the M pieces of the signal lines and each of nX pieces (nx is an integer being four or more) of combinations of the n pieces of the scanning lines and the X pieces of the parity lines belonging to the corresponding parity line group and wherein a displaying state that changes by pixel electrode according to a voltage of the pixel to be applied to a facing electrode occurs;

a signal-line driving unit in which the M pieces of signal lines are sequentially divided into M/X pieces (M/X is an integer being two or more) of signal line groups each including X pieces of the signal lines and the signal line groups are connected to M/X pieces of terminals in a one-to-one relationship and image inputs corresponding to the M pieces of signal lines are sequentially divided into M/X pieces of image input groups each including X pieces of image inputs and X pieces of image signals making up each image input group are supplied sequentially to the M/X pieces of the terminals in a time-division manner;

a scanning-line driving unit to sequentially drive the n pieces of the scanning lines; and a parity-line driving unit to sequentially drive the X pieces of the parity lines;

wherein each of switching elements connected between each of the signal lines and each of the corresponding pixel electrodes is made active in response to driving of each of the scanning lines and any one parity line belonging to the corresponding parity line group so as to supply an image voltage fed from each signal line to each of the pixel electrodes so that bistable display by pixel in the display panel is performed according to a polarity of the image voltage.

In the foregoing second aspect, a preferable mode is one wherein the scanning-line driving unit includes shift registers in n pieces of stages provided so as to correspond to the n pieces of the scanning lines, wherein shift registers in each stage sequentially drive the n pieces of the scanning lines.

Also, a preferable mode is one wherein the parity-line driving unit includes shift registers in X piece of stages making up ring counters provided in a manner to correspond to the X pieces of the parity lines and wherein shift registers in each stage sequentially drive the X pieces of the parity lines.

Also, a preferable mode is one wherein the signal lines, scanning lines, parity lines, and switching elements are placed in a lower portion of each of the pixel electrodes relative to the facing electrode.

Also, a preferable mode is one wherein, during an image writing period, after writing of an image voltage applied to each of the pixel electrodes from signal lines is repeated during a plurality of frame periods, during an image holding period, a voltage of each of the signal lines and of each of the scanning lines is made to be at 0 (zero) volts or is made to be opened.

Also, a preferable mode is one wherein the shift registers are bootstrap-type shift registers wherein start signals or outputs from shift registers in a previous stage are applied to input terminals of the shift registers and output signals from shift registers in a next stage are applied to reset terminals of the shift registers.

Also, a preferable mode is one wherein the switching elements and shift registers are thin-film transistors made of amorphous silicon.

Furthermore, a preferable mode is one wherein the bistable active-matrix display device is made up of an electrophoretic display device.

With the above configurations, the number of signal-line drivers can be reduced and, therefore, it made possible to reduce costs for manufacturing the active-matrix bistable display device.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. According to the present invention, an active-matrix bistable display device is so constructed that, in a bistable display panel in which a pixel electrode is formed at each intersection of each of a plurality (N) of scanning lines extending in a row direction and each of a plurality (M) of signal lines extending in a column direction and a display state that changes for every pixel electrode is made to occur depending on a voltage of each of the pixel electrodes applied to a facing electrode, a signal-line driving unit is provided in which the plurality (M) of signal lines is sequentially divided into a plurality (X) of signal lines and is connected to a plurality (M/X) of terminals and image inputs corresponding to the plurality (M) of signal lines are sequentially divided into a plurality (X) of image inputs and a plurality (X) of image signals making up each group of the image inputs are supplied sequentially to the plurality (M/X) of terminals in a time-division manner and a scanning-line driving unit is provided in which, in the scanning lines made up of a plurality (N/X) of groups of scanning lines, each scanning line making up the plurality (N/X) of groups is sequentially driven for each of the groups of the scanning lines, wherein each of switching elements connected between each of corresponding signal lines and each of the pixel electrodes is made active according to driving of each of the scanning lines so as to supply an image voltage fed from each signal line to each of pixel electrodes so that bistable displaying for every pixel in the display panel is performed depending on a polarity of the image voltage.

First Embodiment

Figure 1:
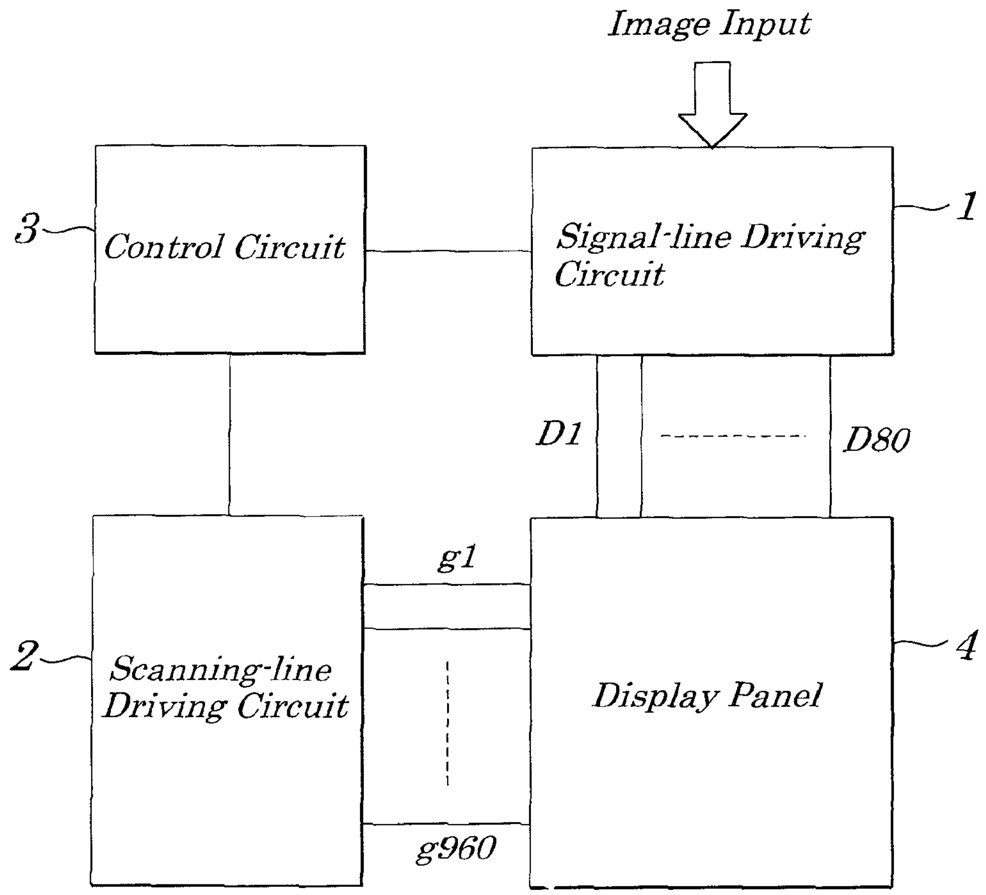
FIG. 1 is a schematic block diagram showing configurations of an active-matrix bistable display device according to a first embodiment of the present invention.
Figure 2:
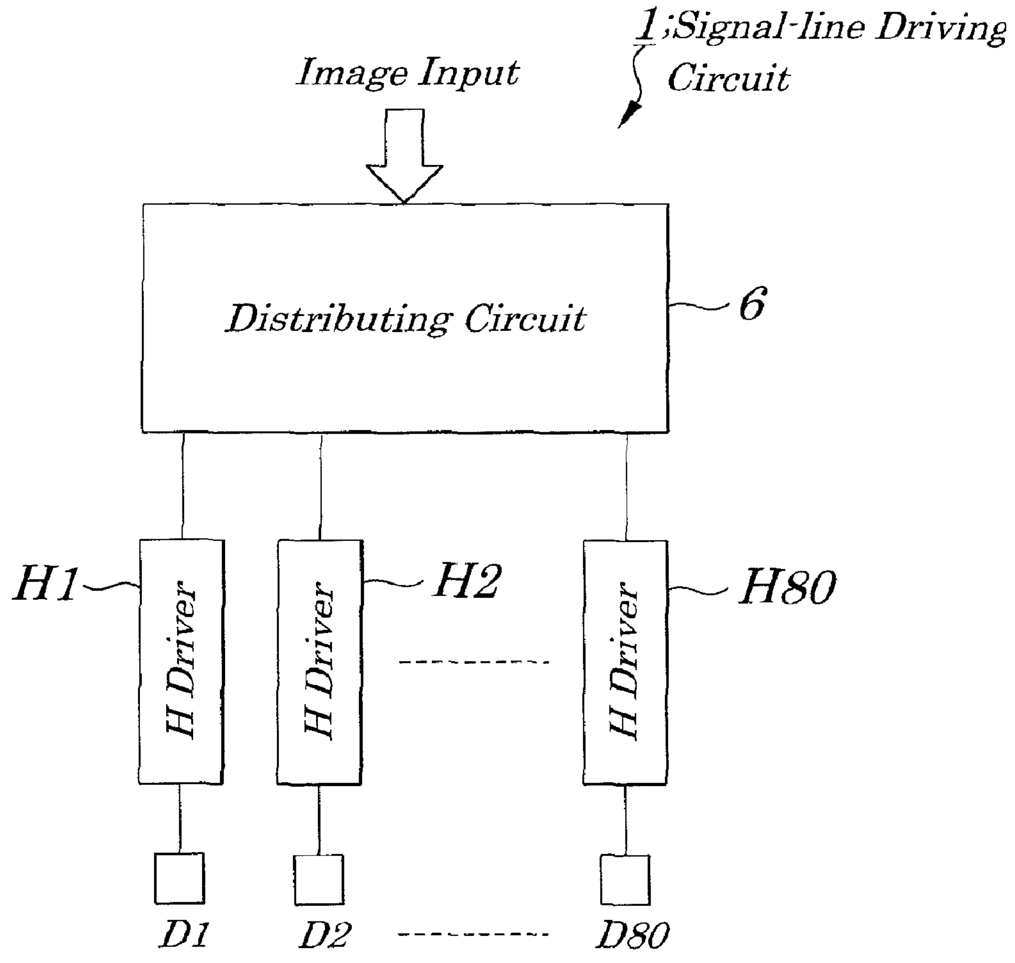
FIG. 2 is a block diagram showing an example of configurations of a signal-line driving circuit according to the first embodiment of the present invention.
Figure 3:
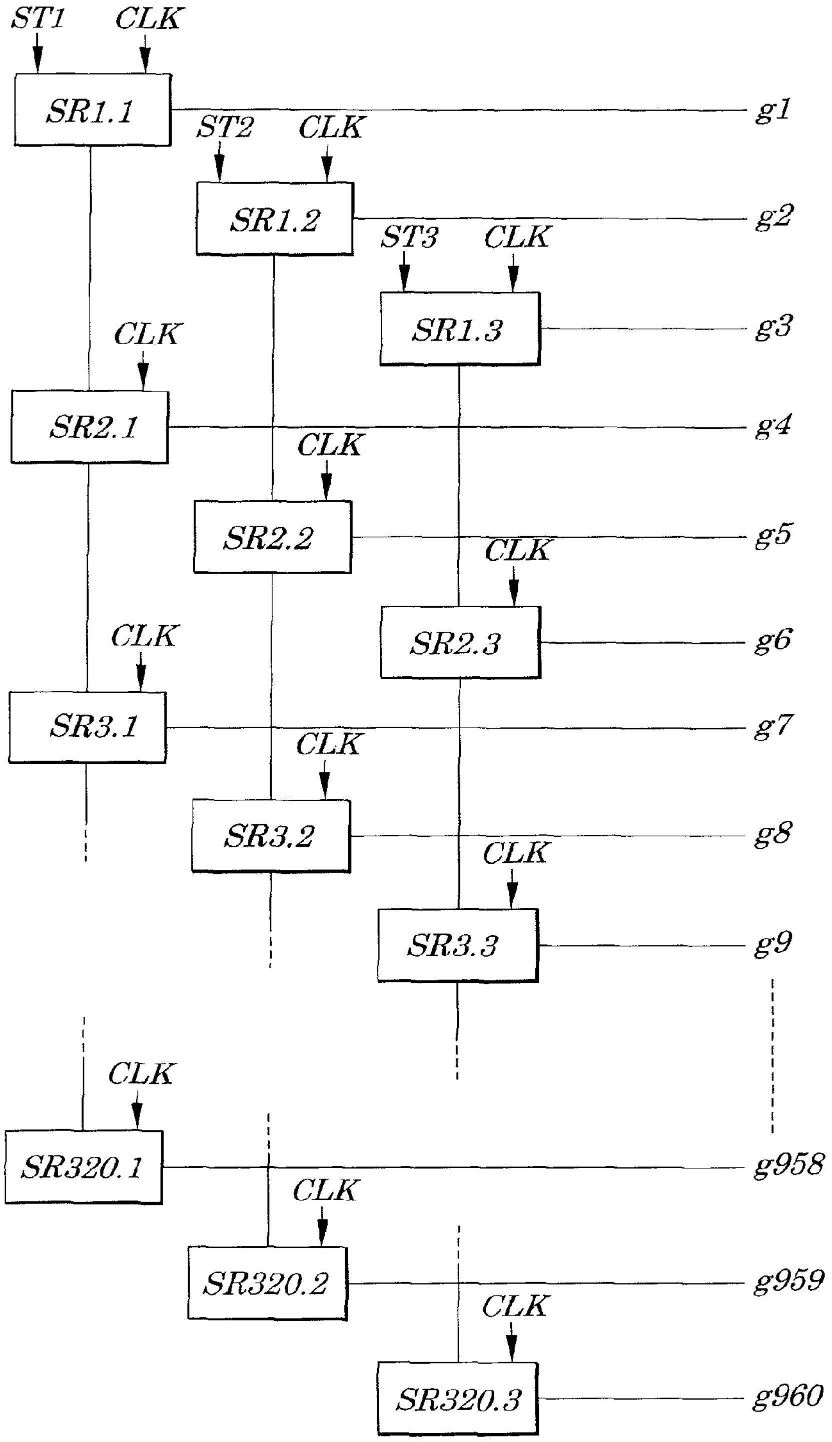
FIG. 3 is a block diagram showing an example of configurations of a scanning-line driving circuit according to the first embodiment of the present invention.
Figure 4:
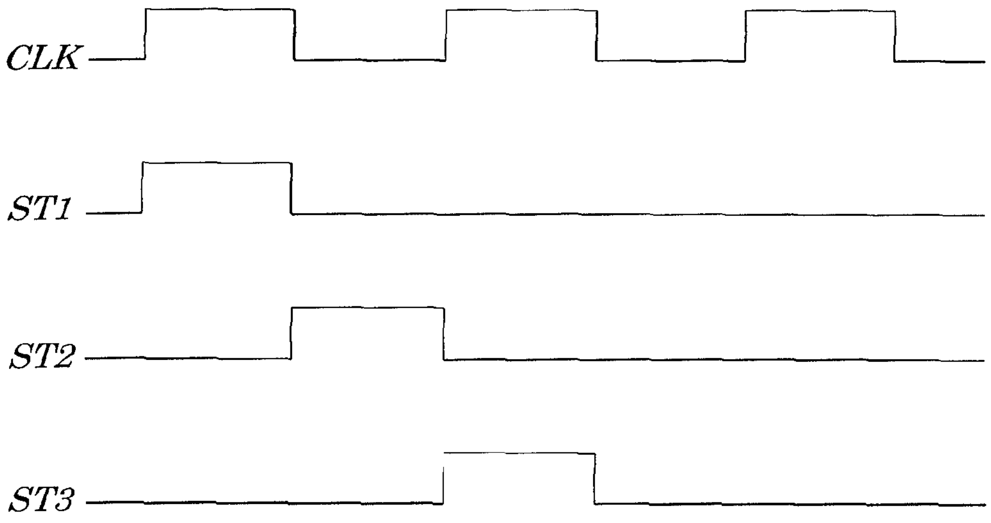
FIG. 4 is a time chart explaining operations of the scanning-line driving circuit of FIG. 3.
Figure 5:
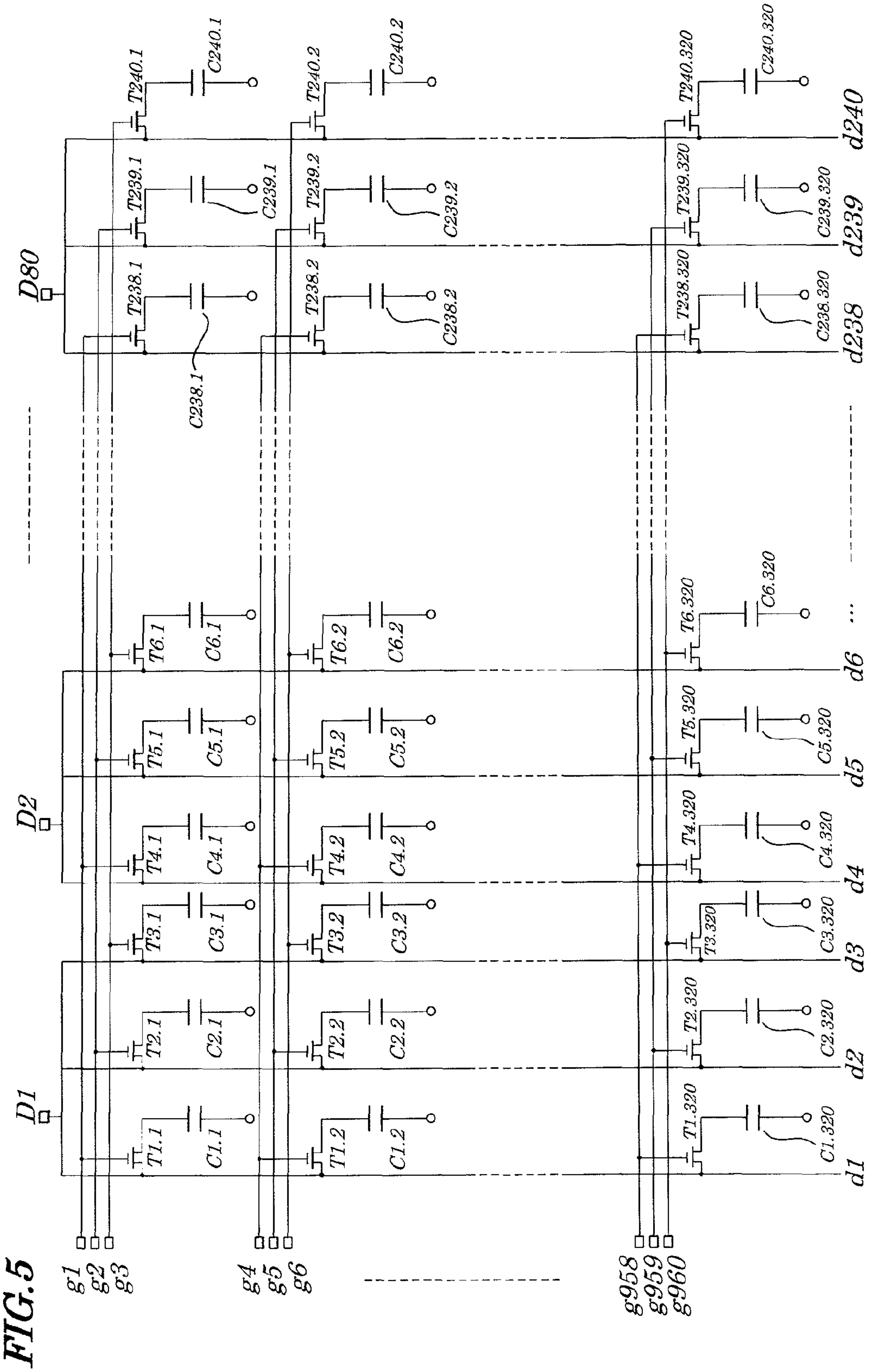
FIG. 5 is a schematic diagram showing configurations of a display panel employed in the active-matrix bistable display device according to the first embodiment of the present invention.
Figure 6:
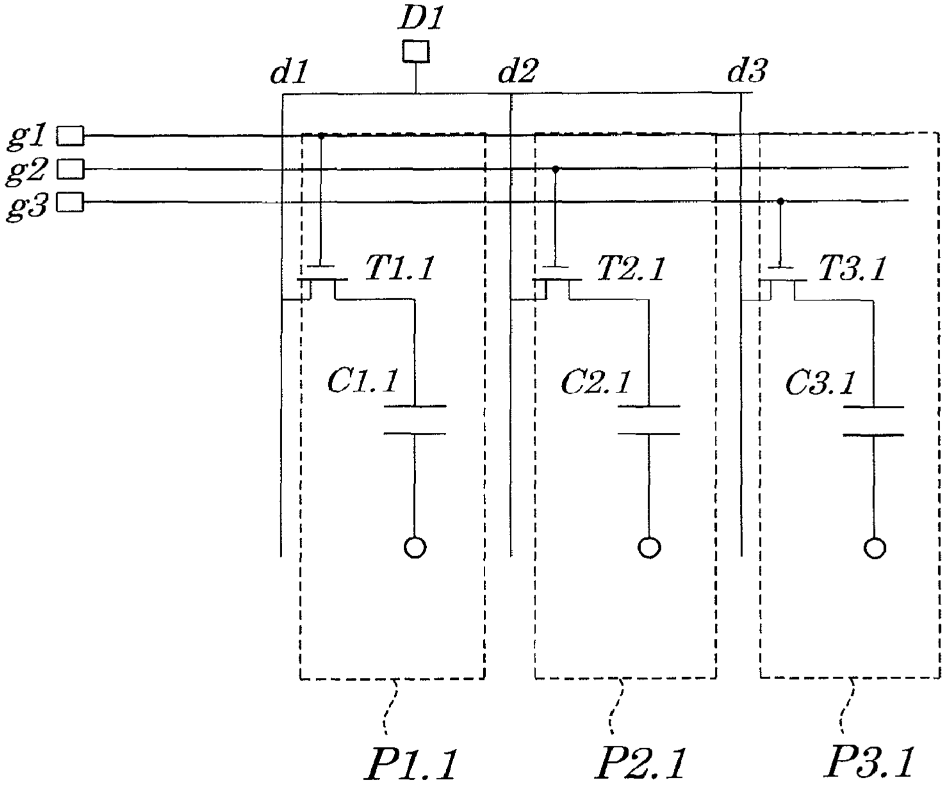
FIG. 6 is a schematic diagram showing a TFT substrate on which pixel electrodes are formed according to the first embodiment of the present invention.
Figure 7:
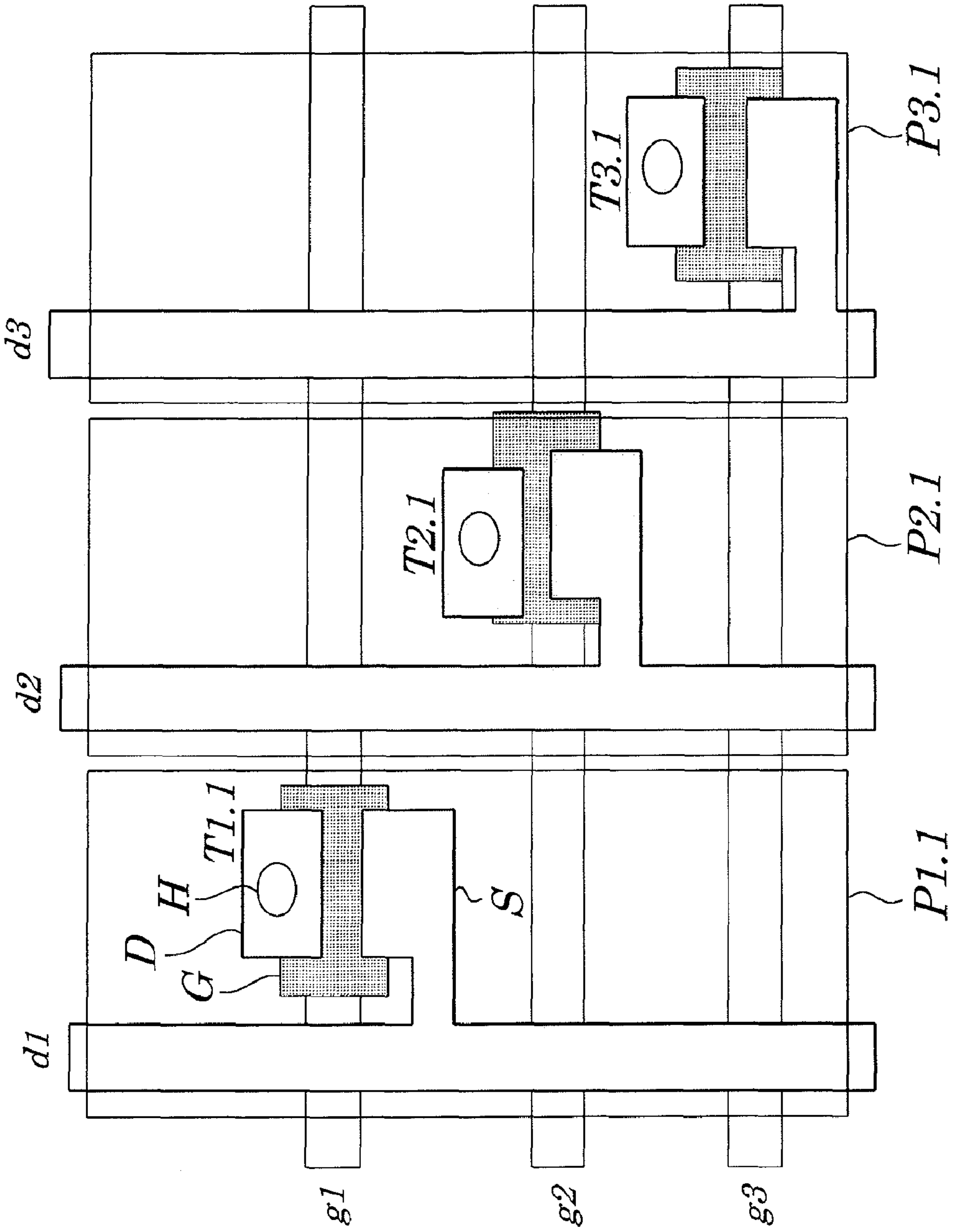
FIG. 7 is a diagram showing the display panel having the TFT substrate on which the pixel electrodes are formed in the active-matrix bistable display device according to the first embodiment of the present invention.
Figure 8:
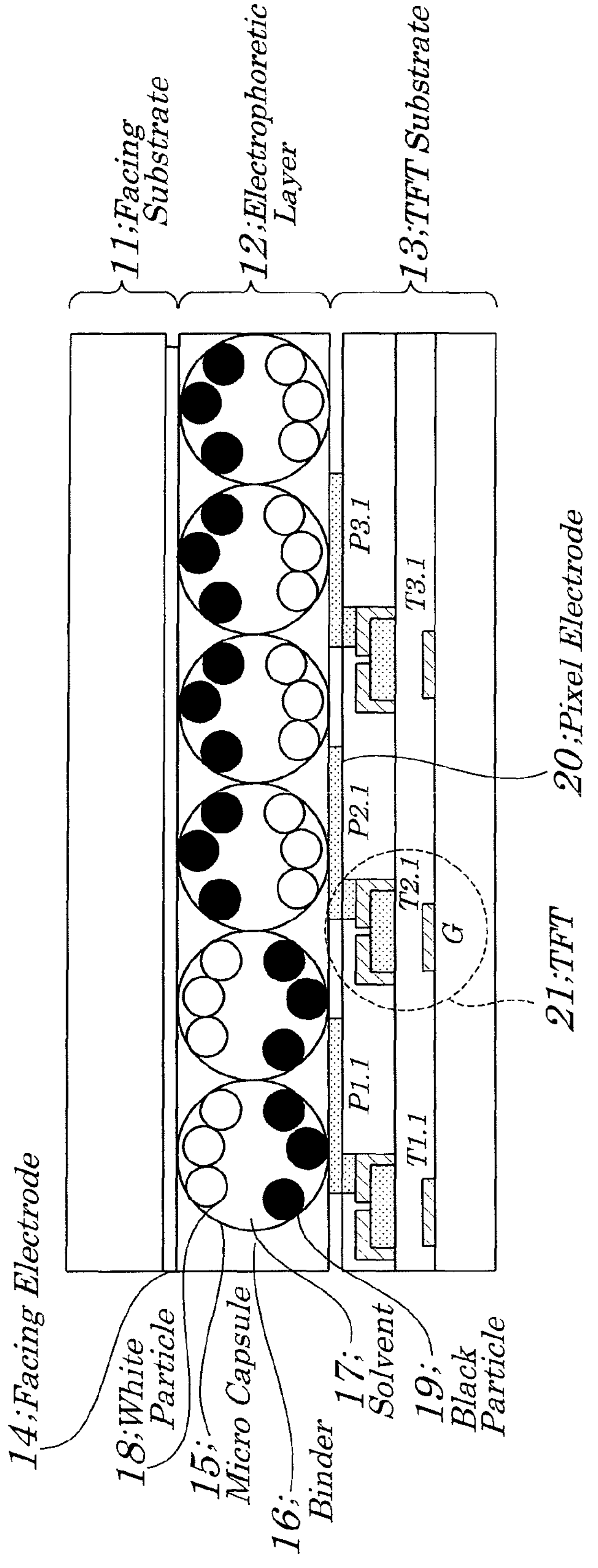
FIG. 8 is a diagram showing cross-sectional configurations of the display panel of the active-matrix bistable display device according to the first embodiment of the present invention.
Figure 9:
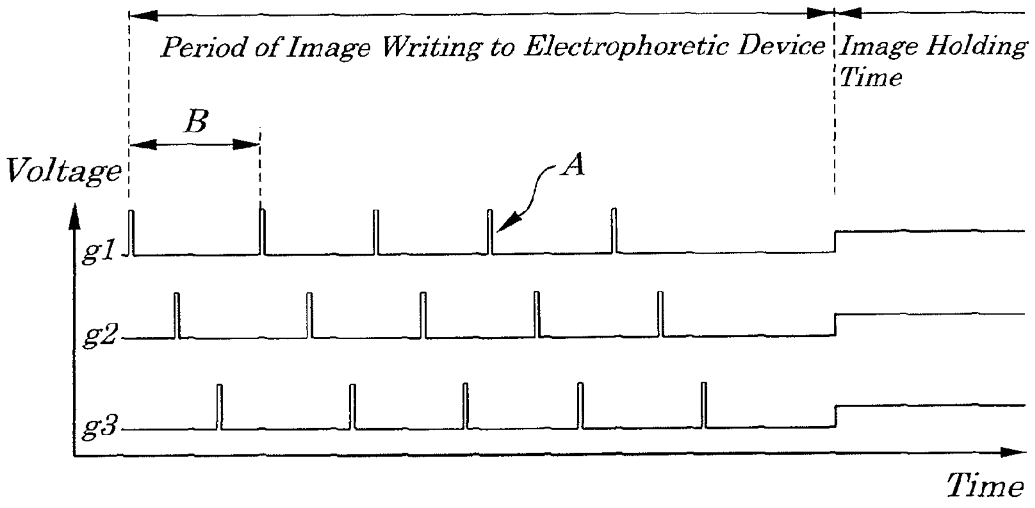
FIG. 9 is a graph explaining driving of the active-matrix bistable display device according to the first embodiment of the present invention.
Figure 10:
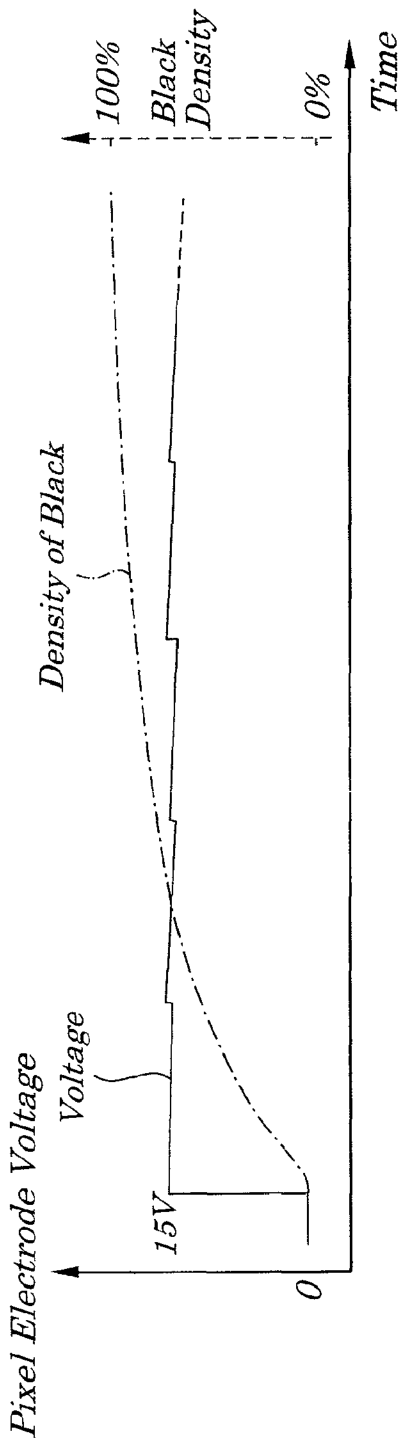
FIG. 10 is a graph showing a relation between a pixel electrode voltage and display density of black in the active-matrix bistable display device according to the first embodiment of the present invention.

FIG. 1 is a block diagram showing entire configurations of an active-matrix bistable display device of a first embodiment of the present invention. FIG. 2 is a block diagram showing an example of configurations of a signal-line driving circuit of the first embodiment. FIG. 3 is a block diagram showing an example of configurations of a scanning-line driving circuit of the first embodiment. FIG. 4 is a timing chart explaining operations of the scanning-line driving circuit of FIG. 3. FIG. 5 is a schematic diagram showing configurations of a display panel employed in the active-matrix bistable display device of the first embodiment. FIG. 6 is a schematic diagram showing a TFT (Thin-Film Transistor) substrate on which pixel electrodes are formed according to the first embodiment. FIG. 7 is a diagram showing configurations of the display panel having the TFT substrate and the pixel electrodes employed in the active-matrix bistable display device of the first embodiment. FIG. 8 is a diagram showing a cross-sectional configuration of the display panel of the active-matrix bistable display device of the first embodiment. FIG. 9 is a graph explaining driving of the active-matrix bistable display device of the first embodiment. FIG. 10 is a graph showing a relation between a pixel electrode voltage and display density of black in the active-matrix bistable display device of the first embodiment.

The active-matrix bistable display device, as shown in FIG. 1, chiefly includes the signal-line driving circuit 1, scanning-line driving circuit 2, control circuit 3, and display panel 4. The signal-line driving circuit 1 drives a plurality of image signal lines formed in, a manner to be extended in a column direction on the display panel 4 according to image inputs. The scanning-line driving circuit 2 drives a plurality of scanning lines formed in a manner to be extended in a row direction on the display panel 4. The control circuit 3 controls operations of the signal-line driving circuit 1 and scanning-line driving circuit 2 and provides a clock signal and/or power needed for the operations. On the display panel 4 are formed a plurality of signal lines extending in the column direction and the plurality of scanning lines extending in the row direction in a manner to correspond to a plurality of pixels formed in the row and column directions and are provided driving transistors made up of TFTs to drive pixels which are formed at each intersection of each of the signal lines and each of the scanning lines.

FIG. 2 shows configurations of the signal-line driving circuit 1 employed in the active-matrix bistable display device of the first embodiment and also shows an example in the case where the active-matrix bistable display device is a QVGA (Quarter Video Graphic Array)-type electrophoretic display device with pixels of 320 rows×240 columns, which chiefly includes a distributing circuit 6 and 80 pieces of signal drivers (horizontal drivers) H1 to H80. The distributing circuit 6 sequentially divides image signals to be input in a manner to correspond to 240 columns of pixels in the display panel 4 into three columns of image signals and inputs, in parallel or in series, the divided image signals to each of the horizontal drivers H1 to H80. Each of the horizontal drivers H1 to H80 sequentially switches, in a time-division way, the input three columns of image signals, according to switching of the scanning lines, so that the image signals are put into an order of an arrangement of signals lines and outputs each of corresponding D terminals D1 to D80. FIG. 3 shows configurations of the scanning-line driving circuit 2 employed in the active-matrix bistable display device of the first embodiment. The scanning-line driving circuit 2 has a function of sequentially distributing scanning signals corresponding to 320 rows of pixels into three scanning lines for outputting and includes a first column shift register made up of one-bit shift registers SR1.1, SR2.1, SR3.1 . . . , SR320.1, second column shift registers made up of one-bit shift registers SR1.2, SR2.2, SR3.2 . . . , SR320.2, and third column shift registers made up of one-bit shift registers SR1.3, SR2.3, SR3.3 . . . , SR320.3. Each of the above registers has a known configuration and operates on the same clock CLK. Start signals ST1, ST2, and ST3 are sequentially supplied respectively to the shift registers SR1.1, SR1.2, and SR1.3 provided in the first stages on every ½ clock.

In the scanning-line driving circuit 2, the shift registers are provided in a manner to correspond to each pixel on the $1^{st}$ row, $2^{nd}$ row, $3^{rd}$ row . . . , $320^{th}$ row on each row and drive scanning lines, that is, the shift registers SR1.1, SR1.2, and SR1.3 are provided in a manner to correspond to the $1^{st}$-row pixel and sequential drive scanning lines g1, g2, and g3, respectively, on every ½ clock, the shift registers SR2.1, SR2.2, and SR2.3 are provided in a manner to correspond to the $2^{nd}$ row pixel and sequential drive scanning lines g4, g5, and g6, respectively, on every ½ clock and, similarly, the shift registers SR320.1, SR320.2, and SR320.3 are provided in a manner to correspond to the 320-th row pixel and sequential drive scanning lines g958, g959, and g960, respectively, on every ½ clock.

FIG. 4 is the timing chart explaining operations of the scanning-line driving circuit 2 employed in the active-matrix bistable display device of the first embodiment, which shows that each of the above shift registers is driven on the same clock and the start signals ST1, ST2, and ST3 are sequentially applied, with delay by ½ clock, respectively to the first shift register making up each row of the shift registers SR1.1, SR1.2, and SR1.3, SR2.1, SR2.2, and SR2.3, SR3.1, SR3.2, and SR3.3 . . . , SR320.1, SR320.2, and SR320.3 shown in FIG. 3.

The display panel of the active-matrix bistable display device of the first embodiment has configurations shown in FIG. 5. FIG. 5 shows an example of the QVGA-type electrophoretic display device in which signal lines (d1, d2, d3), (d4, d5, d6), (d238, d239, d240) connected to D-terminals D1, D2, . . . , D80 of the signal line driving circuit 1 are provided on a TFT substrate in the display panel in a manner to correspond 240 columns of pixels and drive scanning lines (g1, g2, g3), (g4, g5, g6), . . . , (g958, g959, g960) connected to the scanning-line driving circuit 2 are provided in a manner to correspond to 320 rows of pixels and each of TFTs (T1.1, T1.2, . . . , T1.320) is formed at each intersection of the signal line d1 and drive scanning lines g1, g4, . . . , g958, and each of TFTs (T2.1, T2.2, . . . , T2.320) is formed at each intersection of the signal line d2 and each of the drive scanning lines g2, g5, . . . , g959 and each of TFTs (T3.1, T3.2, . . . , T3.320) is formed at each intersection of the signal line d3 and each of the drive scanning lines g3, g6, . . . , g960. Similarly, each of TFTs (T238.1, T238.2, . . . , T238.320) is formed at each intersection of the signal line d238 and each of the drive scanning lines g1, g4, . . . , g958 and each of TFTs (T239.1, T239.2, . . . , T239.320) is formed at each intersection of the signal line d239 and each of the drive scanning lines g2, g5, . . . , g959 and each of TFTs (T240.1, T240.2, . . . , T240.320) is formed at each intersection of the signal line d240 and each of the drive scanning lines g3, g6, . . . , g960 and, when driving of each of the signal lines coincides with that of each of the drive scanning lines, the TFTs connected to the intersections of the signal lines and drive scanning lines become active and switching is done so that voltages of the signal lines are supplied to corresponding pixel capacitors (C1.1, C1.2, . . . , C1.320), (C2.1, C2.2, . . . , C2.320), (C3.1, C3.2, . . . , C3.320), . . . , (C238.1, C238.2, . . . , C238.320), (C239.1, C239.2, . . . , C239.320), and (C240.1, C240.2, . . . , C240.320).

Each of the pixel capacitors represents the capacitor formed between each of the pixel electrodes connected to each of corresponding TFTs shown in an upper portion in FIG. 5 and a facing electrode (not shown) whose connecting state is indicated by each of circular marks shown in a lower portion in FIG. 5.

FIG. 6 is the schematic diagram showing the TFT substrate on which pixel electrodes are formed and also shows an example of only the portion related to pixels formed in the first to third columns in the first row. As shown in FIG. 6, each of the TFTs (T1.1, T2.1, T3.1) corresponding to each pixel formed in the first to third columns in the first row is connected to each of pixel electrodes (P1.1, P2.1, P3.1) making up each of the pixel capacitors (C1.1, C2.1, C3.1) and each of the pixel capacitors is formed between each of the pixel electrodes and a facing electrode (not shown).

FIG. 7 shows configurations of the display panel having the TFT substrate on which the pixel electrodes are formed in the active-matrix bistable display device of the first embodiment, which shows an example of part of the display panel shown in FIG. 5. On the TFT substrate, as shown in FIG. 7, are formed the signal lines d1, d2, and d3 and the drive scanning lines g1, g2, and g3 and each of the TFTs (T1.1, T2.1, T3.1) is placed at each intersection of each of the signal lines d1, d2, and d3 and each of scanning lines g1, g2, and g3. A source S of each of the TFTs (T1.1, T2.1, T3.1) is connected to each of the signal lines d1, d2, and d3 and its drain D is connected, via a hole H formed in an insulating film (not shown) on the TFT substrate, to each of the pixel electrodes P1.1, P2.1, and P3.1. A gate G made of a-Si (amorphous silicon) and connected to each of the scanning lines that the gate intersects is formed between the source S and drain D of each of the TFTs.

FIG. 8 shows a cross-sectional configuration of the display panel of the active-matrix bistable display device of the first embodiment which corresponds to the TFT substrate shown in FIG. 7. The display panel chiefly includes a facing substrate 11, an electrophoretic layer 12, and a TFT substrate 13, all of which are stacked in layers.

The facing substrate 11 is made of a transparent plate such as glass or a like. On an inner side of the facing substrate 11 is formed a facing electrode 14 made up of a transparent conductive film. The electrophoretic layer 12 is formed in a film shape and is made up of micro capsules 15, binders 16 filled among the micro capsules 15 for binding the micro capsules 15. A solvent 17 made of isopropyl alcohol (IPA) or a like is hermetically sealed in each of the micro capsules 15 and white particles 18 made of titanium oxide and black particles 19 made of carbon are dispersed in the solvent 17. The white particles 18 have a negatively-charged polarity, whereas the black particles 19 have a positively-charged polarity. The TFT substrate 13 has a four-layered structure. In the first layer formed nearest to the electrophoretic layer 12 is formed a plurality of pixel electrodes 20. Next second and third layers are made of insulating films in which a plurality of TFTs, each being connected to each of corresponding pixel electrodes 20, are formed. The "G" portion formed in the third layer represents gate electrodes of the TFTs. The fourth layer being a lowermost layer makes up a basic body layer which is formed to integrally hold the first to third layers.

FIG. 8 shows a state in which a (−) voltage has been applied from the signal line (not shown) to the pixel electrode P1.1 through the TFT1.1 and a (+) voltage has been applied from the signal line (not shown) to the pixel electrodes P2.1 and P3.1 through the TFT2.1 and TFT3.1 respectively and, as a result, the black particles 19 in the micro capsule 15 are attracted toward the pixel electrode P1.1 and relatively more white particles 18 in the micro capsule 15 are attracted toward the facing electrode 14, whereas the white particles 18 in the micro capsule 15 are attracted toward the pixel electrodes P2.1 and P3.1 and relatively more black particles 19 in the micro capsule 15 are attracted toward the facing electrode 14. These operations show that images consisting of white and black are displayed on the facing electrode 14 side.

FIG. 9 shows the graph explaining driving operations of the active-matrix bistable display device. As shown in FIG. 9, during an image writing period, by making each of the drive scanning lines g1, g4, . . . , g958 be sequentially turned ON in the first frame, each image voltage fed from the signal line d1 is sequentially applied for writing to each of the pixel capacitors C1.1, C1.2, . . . , C1.320. Also, during the image writing period, by making each of the scanning lines g2, g5, . . . , g959 be sequentially turned ON with delay of ½ clock in the second frame, each image voltage fed from the signal line d2 is sequentially applied for writing to each of the pixel capacitors C2.1, C2.2, . . . , C2.320. Also, during the image writing period, by making each of the scanning lines g3, g6, . . . , g960 be sequentially turned ON with further delay of ½ clock in the third frame, each image voltage fed from the signal line d3 is sequentially applied to each of the pixel capacitors C3.1, C3.2, . . . , C3.320.

A series of operations to be performed during a time period from the first frame to third frame is now defined as "one set" operation and writing to each pixel is achieved by repeating the same operations "five-set" times. In FIG. 9, only the first scanning signals for "one-set" operation which is to be repeated "five-set" times are shown by "A". During the writing period of one frame shown by "B", writing operations for each signal line are performed 320 times in a manner to correspond to 320 rows of pixels and, therefore, each of the horizontal drivers of the signal line driving circuit 1 switches pixel signals to respond to the writing operations. Now, assuming that these operations are repeated at a frequency of 60 Hz and one frame period is 1/60 second, the writing operation for "five-set" are performed at $(1/60)\times3\times5=250$ ms. This time corresponds to a response speed of the active-matrix bistable electrophoretic display device and, therefore, writing during sufficient time period to each pixel is made possible. Since the writing operation to each pixel is performed for every one set, it is necessary for the pixel capacitor to hold a pixel voltage for 3 frames of time (50 ms). However, the electrophoretic display device is a reflective-type display device having no backlight in which a leakage current from TFTs is small and, therefore, has a satisfactory holding characteristic.

FIG. 10 is a graph showing a relation between a pixel electrode voltage and display density of black in the active-matrix bistable display device of the first embodiment. Now, assuming that a voltage of 15 V is supplied to the pixel electrode for every writing of one time black display to each pixel, though the pixel electrode voltage drops somewhat during three frames of holding periods, the voltage is compensated for at every time of writing and an image writing period is held almost at the same level. As a result, in the active-matrix bistable electrophoretic display device, black particles which tend to be positively charged are attracted toward the facing electrode being held at a zero potential, causing black display density to rise gradually and, when the writing period is over, the black density reaches 100% as shown in FIG. 10.

Thus, according to the active-matrix bistable electrophoretic display device of the embodiment, though a scale of a portion of low-priced scanning line driving circuit becomes larger, since a scale of a portion of high-priced signal line driving circuit becomes smaller, it is made possible to reduce costs for fabricating the active-matrix bistable electrophoretic display device. The reason why such the driving as described above is made possible in the active-matrix bistable electrophoretic display device is that a memory-type display device such as an electrophoretic display element or a like is used. In a conventional non-memory type liquid crystal display device, in order to perform such the driving operation as described above, scanning lines g1, g4, . . . , are driven in a first frame, scanning lines g2, g5, . . . , are driven in a second frame, scanning lines g3, g6, . . . , are driven in a third frame. However, a decrease in luminance in a liquid crystal on a pixel on which writing operations have been performed in the first frame occurs in the second and third frames (due to a gradual decrease in voltages applied to the pixel). Due to this, a decrease in luminance occurs in every frame in every group of pixels on which writing operations have been performed in each of the first to third frames, thus causing flicker. If a memory-type device is used, no decrease in luminance occurs in the pixel once writing operations have been performed and, therefore, no change in luminance in every frame occurs, thus preventing occurrence of the flicker.

According to the active-matrix bistable electrophoretic display device of the first embodiment, the display element has a memory property and, therefore, by driving a pixel in an interlaced manner, the image writing period can be lengthened sufficiently and the occurrence of the flicker can be prevented and power consumption can be lowered.

Second Embodiment

Figure 11:
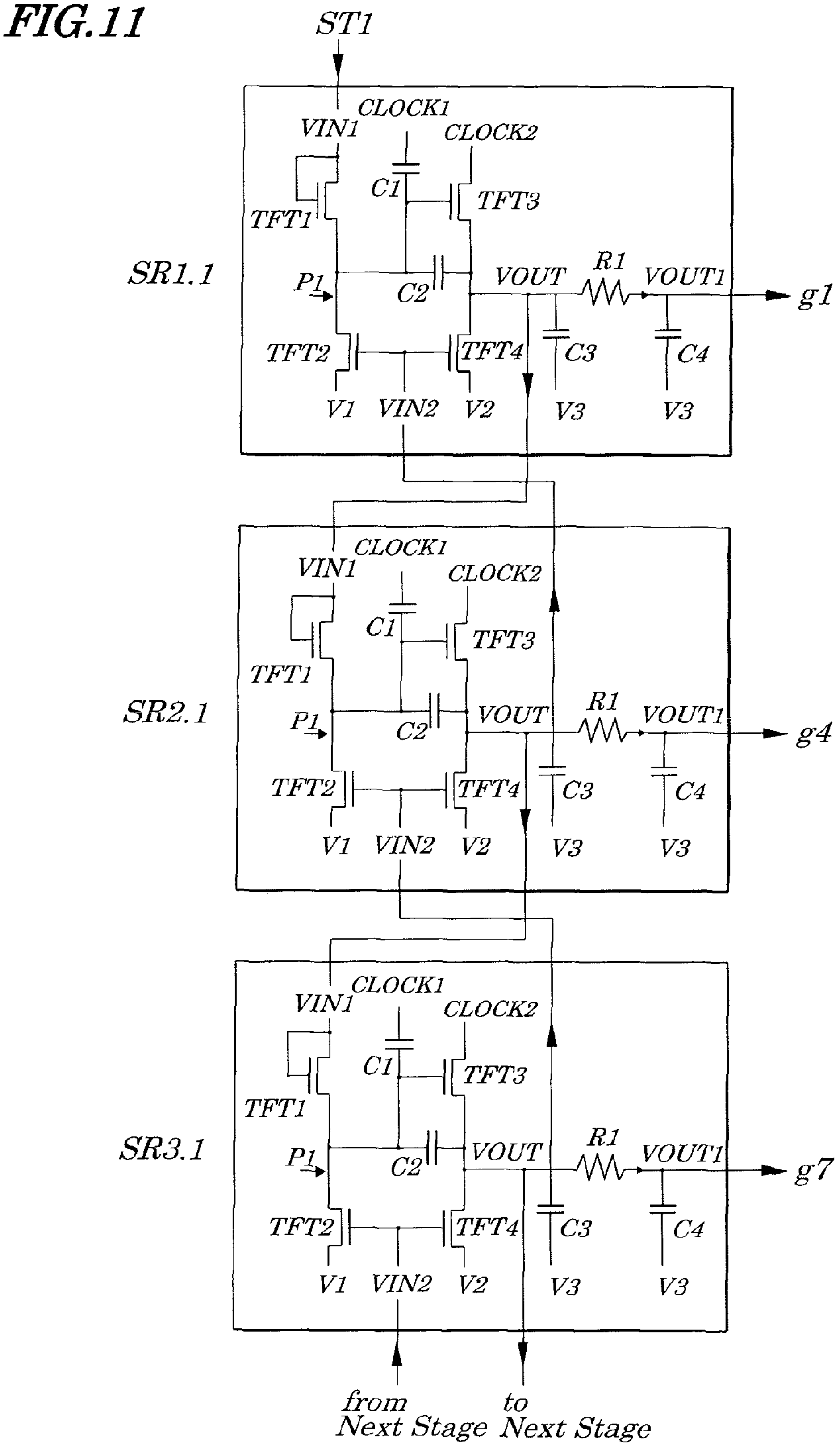
FIG. 11 is a schematic diagram showing configurations of a scanning line driving circuit employed in an active-matrix bistable display device according to a second embodiment of the present invention.
Figure 12:
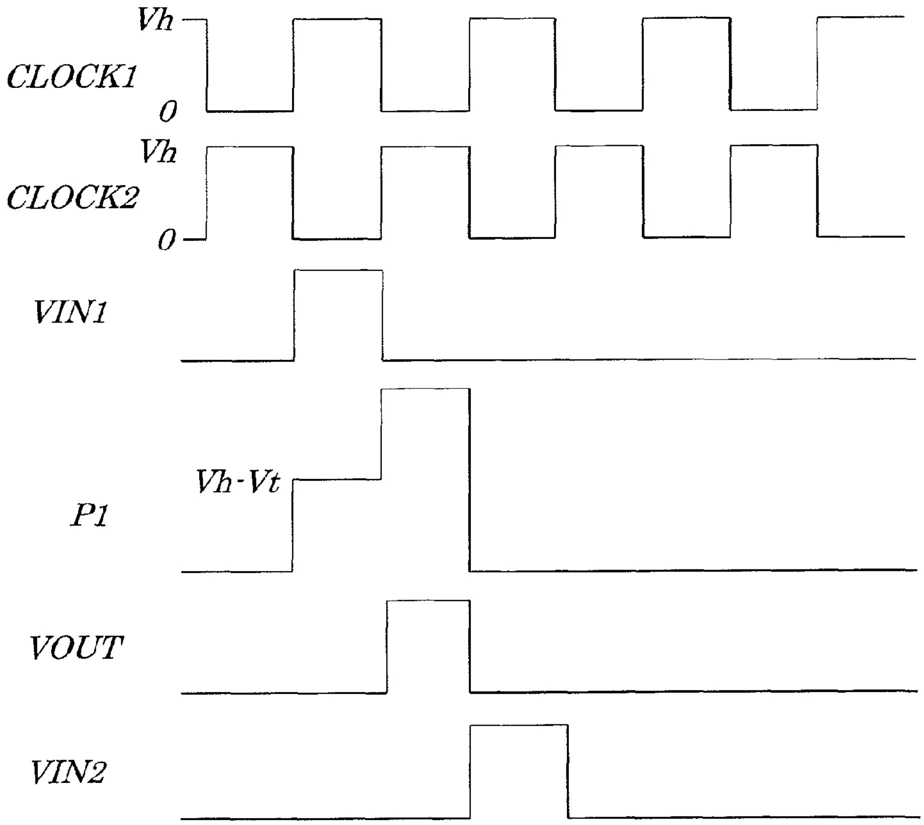
FIG. 12 is a timing chart explaining operations of the scanning line driving circuit according to the second embodiment of the present invention.

FIG. 11 is a schematic diagram showing configurations of a scanning line driving circuit employed in an active-matrix bistable display device of a second embodiment of the present invention. FIG. 12 shows a timing chart explaining operations of the scanning line driving circuit of the second embodiment. Configurations of the scanning line driving circuit of the second embodiment are the same as those in the first embodiment shown in FIG. 3, however, configurations of shift registers are different from those in the first embodiment. Hereinafter, an example of configurations of the shift registers corresponding to one column of pixels is shown in FIG. 11, which corresponds to configurations of shift registers SR1.1, SR2.1, SR3.1, . . . , shown in FIG. 3.

As shown in FIG. 11, all of the shift registers SR1.1, SR2.1, SR3.1, . . . , have configurations of an identical bootstrap-type shift register. In each of the registers SR1.1, SR2.1, SR3.1, . . . , each of TFT1, TFT2, TFT3, TFT4 is an a-Si TFT and C1, C2, C3, C4 are capacitors, and R1 is a resistor. The TFT1 and TFT2 are connected in series between an input terminal VIN1 and a power source V1 and the TFT3 and TFT4 are connected in series between a clock terminal CLOCK2 and a power source V2. A gate of the TFT1 is connected to its source. Gates of the TFT2 and TFT4 are connected to a reset input terminal VIN2. A gate of the TFT3 is connected to a drain of the TFT1 and to a clock terminal CLOCK1 through the capacitor C1 and to the drain of the TFT1 through the capacitor C2. The resistor R1, capacitor C3, and capacitor C4 make up a low-pass filter and are connected between an output terminal VOUT of a drain of the TFT3 and each of scanning lines (g1, g4, g7, . . . ). The other terminals of the capacitor C3 and C4 are connected to a ground V3.

FIG. 12 is the timing chart showing operations of each shift register making up the scanning line driving circuit of the second embodiment. In FIG. 12, the CLOCK1 and CLOCK2 are clocks being of opposite polarity. When a start signal ST1 or the output VOUT in the previous stage is input to a terminal of the input VIN1, a potential at a point P1 on the side of the drain of the TFT1 rises to become Vh-Vt and, at this timing, the TFT3 is turned ON. "Vh" is a high-level voltage of the clock CLOCK 1 and the "Vt" is a threshold voltage of the TFT. Next, when the clock CLOCK 2 goes high, the output VOUT also goes high. At this time point, since the P1 point is connected to a terminal of the output VOUT through the capacitor C2, a voltage at the P1 point becomes higher than the clock potential Vh.

By performing such the operations as above, a potential of the output VOUT reaches a potential level being equivalent to the clock potential Vh. Each of the shift registers in a next stage, when a terminal of the OUTPUT in the previous stage is connected to the terminal of the input VIN1, performs the same operations as above. When the output OUTOUT in the next stage is supplied to a terminal of a reset input VIN2 with timing shown in FIG. 12, the TFT 2 and TFT 4 are turned ON and, therefore, the potential of the output VOUT and a potential at the P1 point fall according to the supply power V1 and V2. Here, the V1 and V2 are negative voltage Vss of the gates of the TFT 2 and TFT 4.

The scanning-line driving circuit that performs entirely the same operations as the scanning-line driving circuit 1 of the first embodiment shown in FIG. 3 can be achieved by providing three rows of the shift registers as shown in FIG. 11 in a manner to correspond to the registers (SR1.1, SR2.1, SR3.1, . . . ), (SR1.2, SR2.2, and SR3.2, . . . ), and (SR1.3, SR2.3, SR3.3, . . . ) shown in FIG. 3 and applying the same clock to each of the rows of the shift registers and by supplying, as shown in FIG. 4, the start signals ST1, ST2, ST3, in a manner to be deviated by ½ clock, to a terminal of the input VIN1 in the first stage of each of the rows of the above shift registers.

The scanning-line driving circuit of the second embodiment is fabricated with the same process as the TFT substrate. Therefore, if the a-Si TFT is used, mobility of the a-Si TFT is as low as about $\mu$=0.3 $cm^2$/Vs and a size of the a-Si TFT is large and, as a result, there is a problem of an increase in power consumption. However, in the active-matrix bistable display device of the second embodiment, images are written in an interlaced manner and the scanning-line driving circuit is not operated during the image holding period and, therefore, an increase in power consumption does not occur and formation of the scanning-line driving circuit by using the a-Si TFT is possible.

Also, due to low mobility of an a-Si TFT, an ordinary liquid crystal display device having a scanning-line driving circuit made up of the a-Si TFT can be used only in a display device with low definition using, for example, QCIF (Quater Common Intermediate Format) (160×120 pixels) to QVGA (Quarter Video Graphics Array) (320×240 pixels) display specifications. However, in the active-matrix bistable display device of the embodiment, since images are written in an interlaced manner, gate turn-on time of a transistor can be made longer and, as a result, the liquid crystal display device having the scanning-line driving circuit made up of the a-Si TFT can be used in a display device with high definition using VGA (640×480 pixels) to SVGA (Super Video Graphics Array) (800×600 pixels) display specifications. Moreover, by lengthening an interlacing period (dividing period) further, the active-matrix bistable display device of the embodiment can be applied to a crystal display device with higher definition.

Third Embodiment

Figure 13:
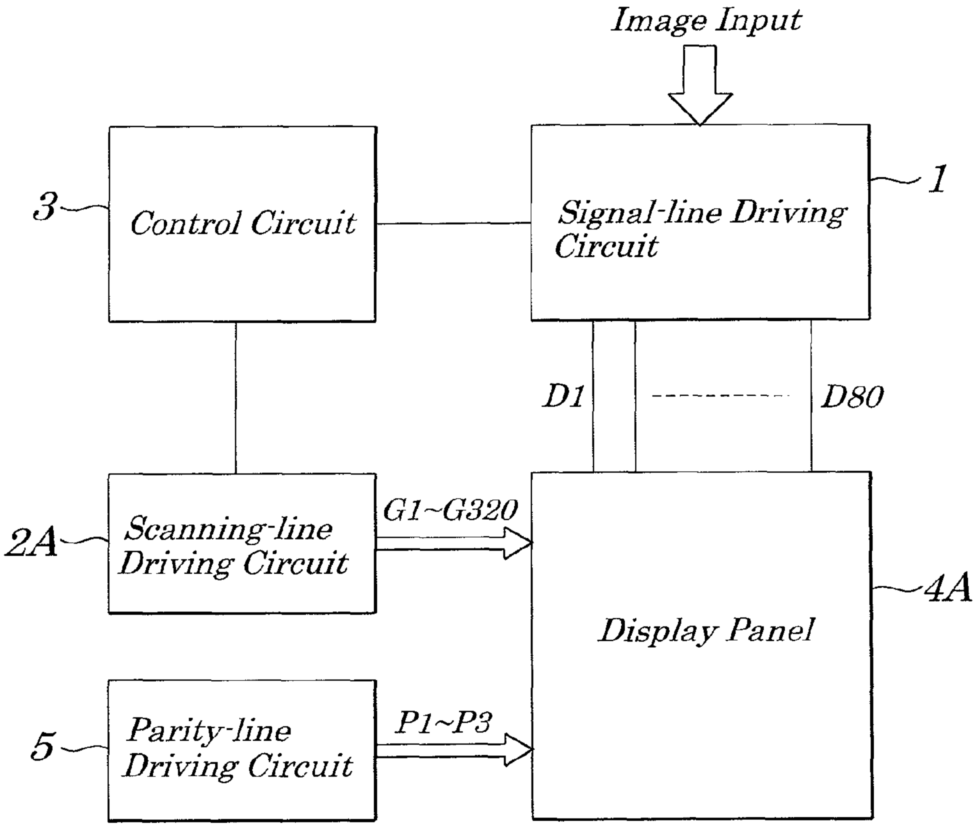
FIG. 13 is a block diagram showing entire configurations of an active-matrix bistable display device according to a third embodiment of the present invention.
Figure 14:
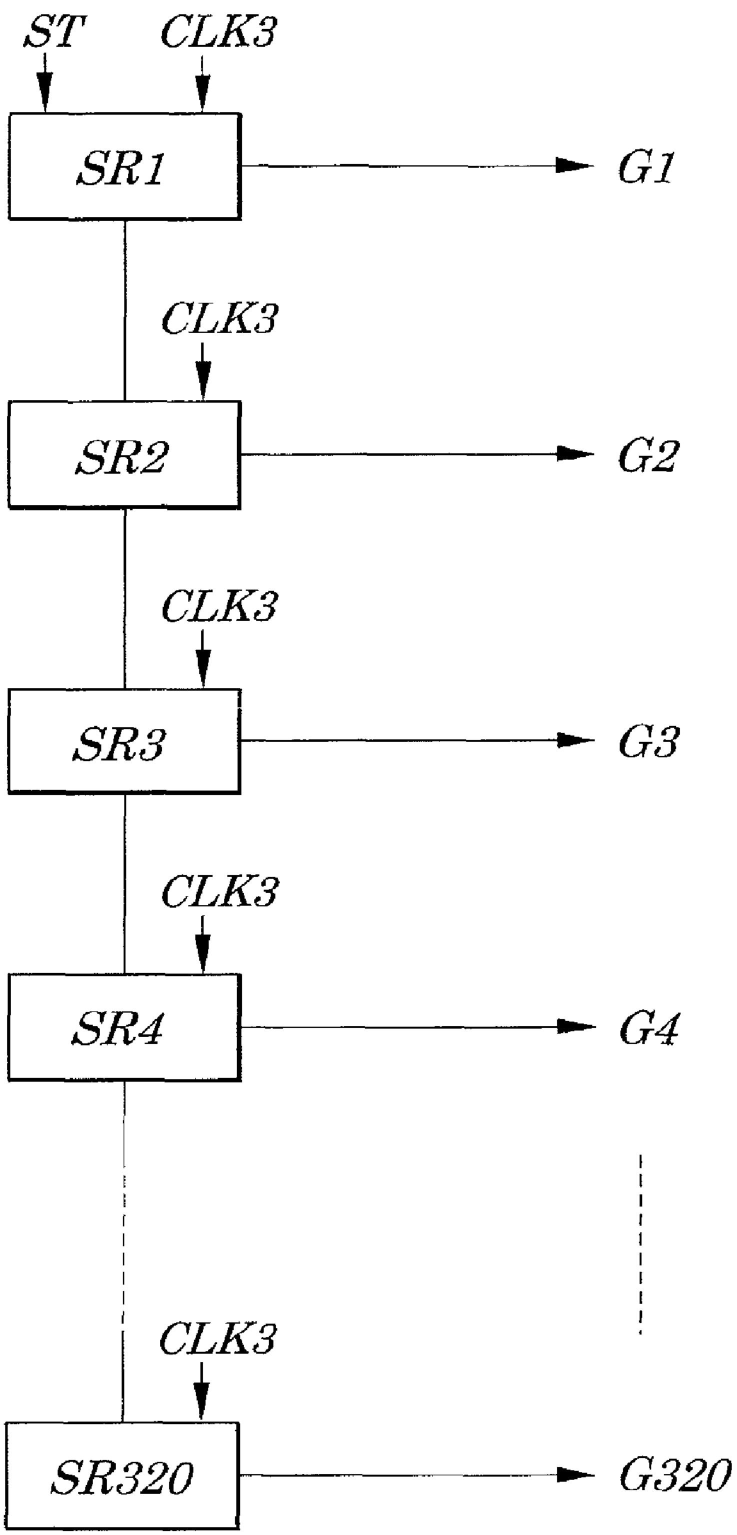
FIG. 14 is a block diagram showing configurations of a scanning-line driving circuit according to the third embodiment of the present invention.
Figure 15:
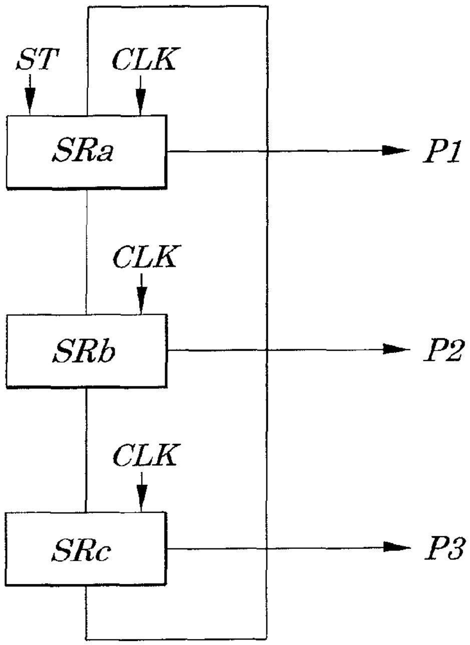
FIG. 15 is a block diagram showing configurations of a parity-line driving circuit according to the third, embodiment of the present invention.
Figure 16:
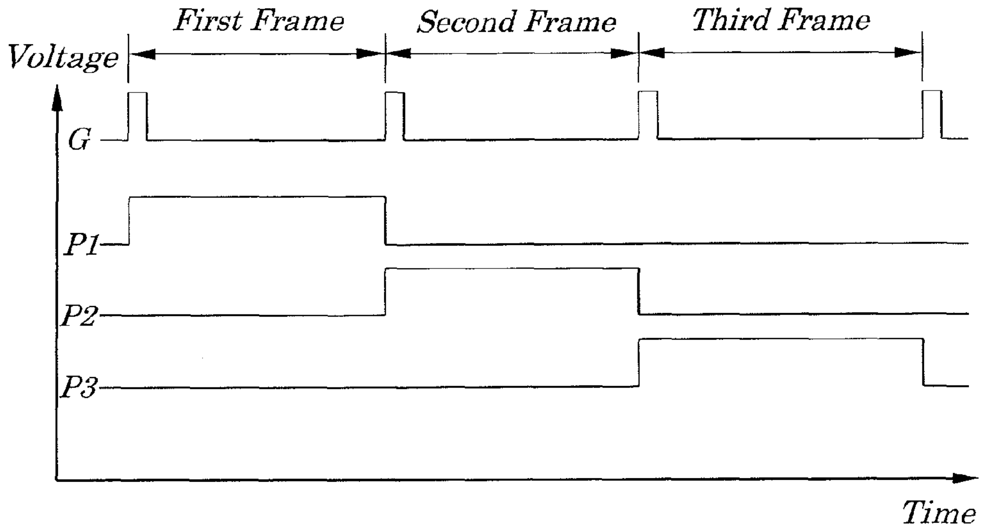
FIG. 16 is a graph explaining operations of the parity-line driving circuit according to the third embodiment of the present invention.
Figure 17:
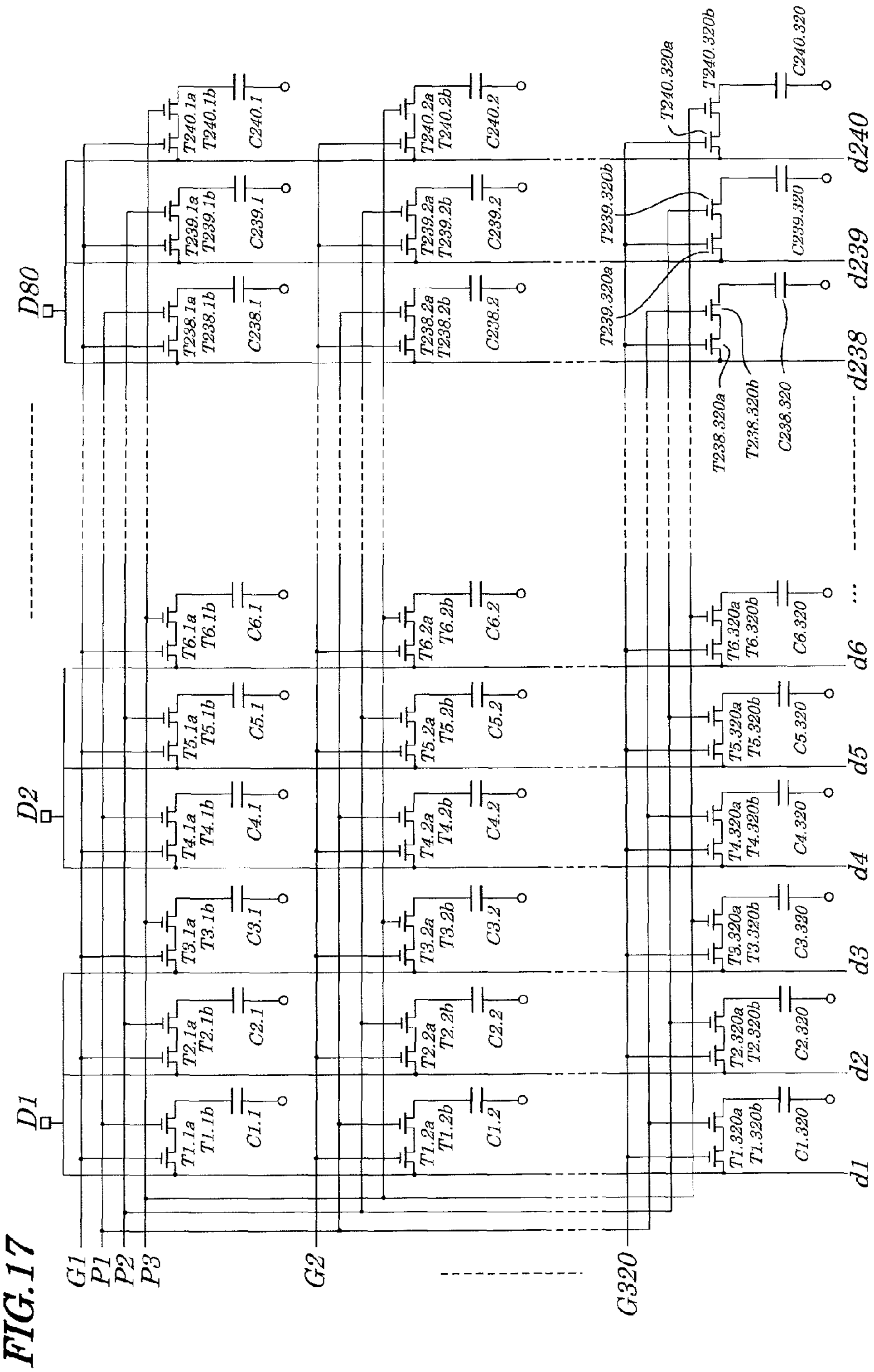
FIG. 17 is a schematic diagram showing configurations of a display panel employed in the active-matrix bistable display device according to the third embodiment of the present invention.
Figure 18:
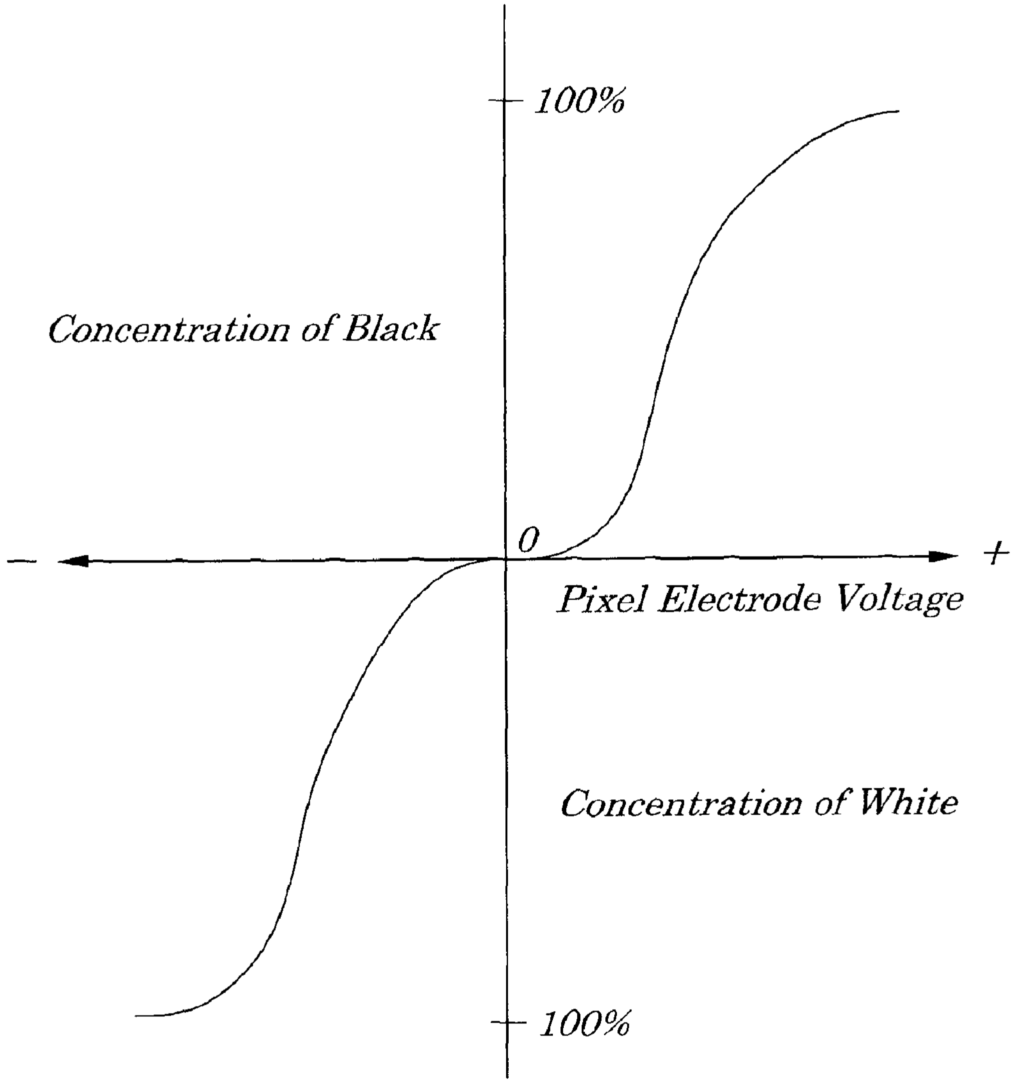
FIG. 18 (RELATED ART)
FIG. 18 is a graph showing an example of displaying characteristics of a conventional electrophoretic display device.
Figure 19:
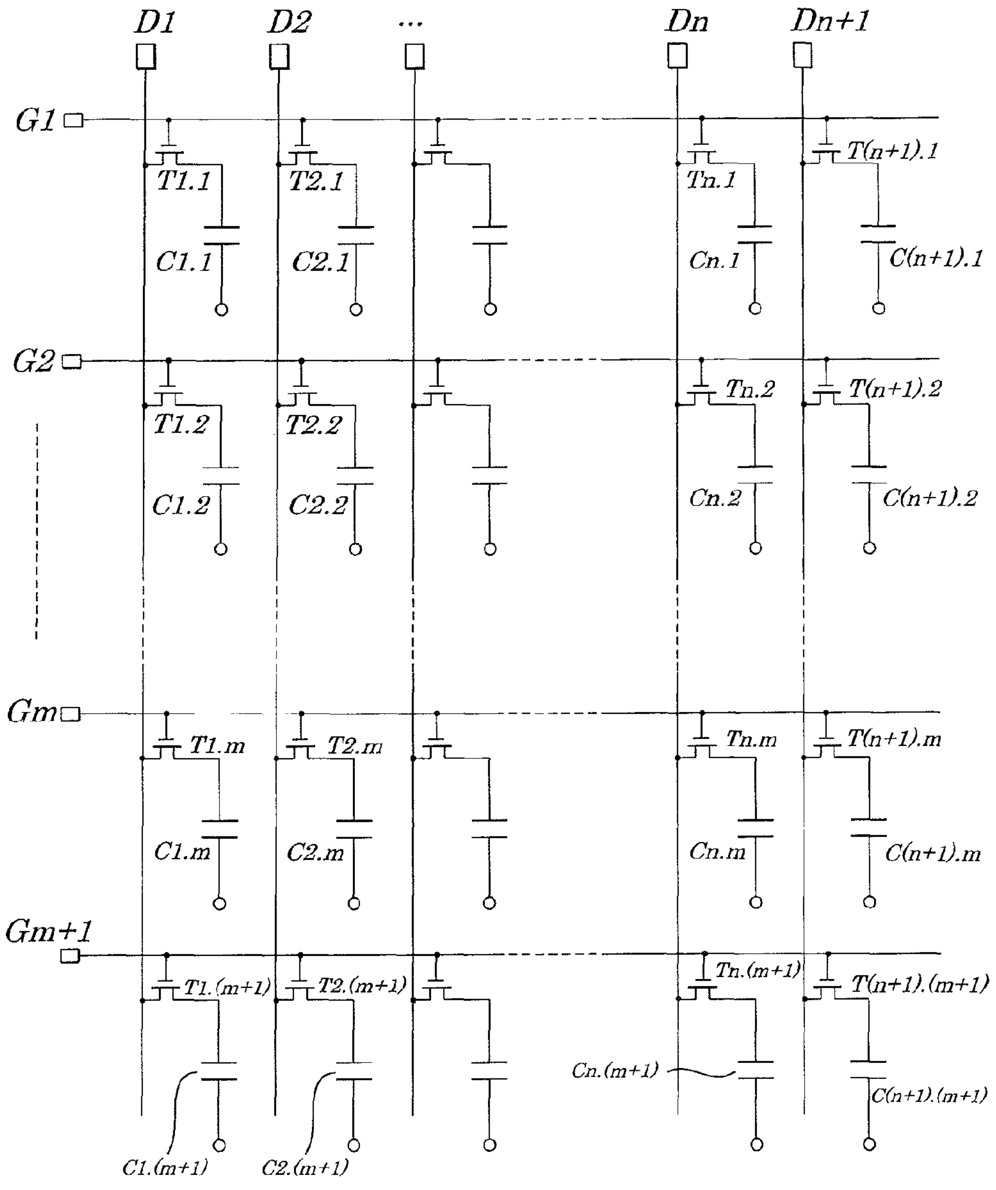
FIG. 19 (RELATED ART)
FIG. 19 is a schematic diagram showing configurations of a display panel when a display section of a conventional electrophoretic display panel is driven in an active mode.
Figure 20A:
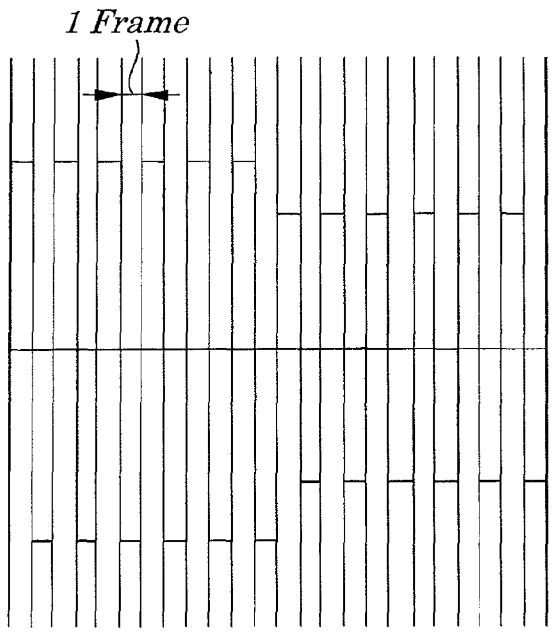
FIGS. 20A and 20B are diagrams explaining a difference in a driving method between a conventional ordinary liquid crystal display device and a conventional bistable display device, respectfully.
Figure 20B:
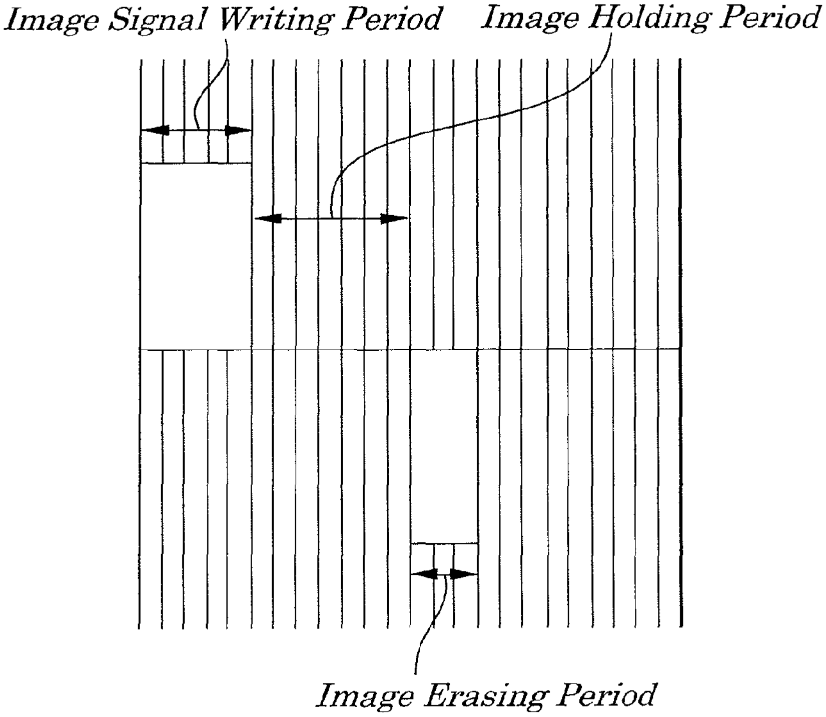

FIG. 13 is a block diagram showing entire configurations of an active-matrix bistable display device of a third embodiment of the present invention. FIG. 14 is a block diagram showing configurations of a scanning-line driving circuit of the third embodiment. FIG. 15 is a diagram showing configurations of a parity-line driving circuit of the third embodiment. FIG. 16 is a graph explaining operations of the parity-line driving circuit of the third embodiment. FIG. 17 is a schematic diagram showing configurations of a display panel employed in the active-matrix bistable display device of the third embodiment.

The active-matrix bistable display device of the third embodiment, as shown in FIG. 13, includes a signal-line driving circuit 1, a scanning-line driving circuit 2A, a control circuit 3, a display panel 4A, and a parity-line driving circuit 5. Configurations of the signal-line driving circuit are the same as those in the first embodiment shown in FIG. 2. The control circuit 3 generates the number of start signals being different from that generated in the first embodiment, however, its configurations are almost the same as those in the first embodiment.

FIG. 14 shows configurations of the scanning-line driving circuit 2A employed in the active-matrix bistable display device of the third embodiment, which has a function of sequentially outputting 320 scanning signals corresponding to 320 rows of pixels and one-bit shift registers SR1, SR2, SR3, SR4, . . . , and SR320 are cascaded in order. Each of the shift registers SR1, SR2, SR3, SR4, . . . , and SR320 may have known configurations or may be made up of the bootstrap-type shift registers and operates when all the same clock CLK 3 is applied thereto. By providing a start signal ST to the shift register SR1 in the first stage, scanning signals are output sequentially to scanning lines G1, G2, G3, . . . , and G320 for every one cycle of the clock CLK 3. The clock CLK 3 has a period being three times longer than that of the clock CLK in the first embodiment.

FIG. 15 shows configurations of the parity-line driving circuit 5 of the third embodiment, which has a function of sequentially driving three parity lines provided to each of 320 rows of pixels. As shown in FIG. 15, in the parity-line driving circuit 5, the one-bit shift registers SRa, SRb, and SRc are sequentially connected in a manner to form a ring-like shape, which makes up a ring counter and starts operations by receiving start signals ST and sequentially outputs parity signals to the parity lines P1, P2, and P3. In this case, also, each of the shift registers SRa, SRb, and SRc may have known configurations or may be made up of the bootstrap-type shift registers described by referring to FIG. 11.

FIG. 16 shows the graph explaining operations of the parity-line driving circuit 5 in the active-matrix bistable display device. As shown in FIG. 16, when scanning signals are applied to a scanning line G during the first to third frames, in response to these operations, parity signals are output sequentially to the parity lines P1, P2, and P3.

FIG. 17 shows configurations of the display panel 4A employed in the active-matrix bistable display device of the third embodiment and, as in the case of the first embodiment, shows an example in the case where the active-matrix bistable display device is a QVGA-type electrophoretic display device, in which, on a TFT substrate of the display panel 4A, signal lines (d1, d2, d3), (d4, d5, d6), . . . , (d238, d239, d240), each being connected to D terminals D1, D2, . . . , D80 of the signal-line driving circuit 1 are arranged so as to correspond to 240 columns of pixels and the scanning lines G1, G2, . . . , G320 extended from the scanning-line driving circuit 2 are arranged so as to correspond to 320 rows of pixels, and the parity lines P1, P2, and P3 are arranged for every scanning line. For example, at the intersection among the signal line d1, scanning line G1, and parity line P1 are formed the TFTs (T1.1*a*, T1.1*b*) which are connected in series to the pixel capacitor C1.1 and, when coincidence of driving among the signal line d1, scanning line G1, and parity line P1 occurs, the TFTs (T1.1*a*, T1.1*b*) become active and switching is done so that a signal line voltage is supplied to the corresponding pixel capacitor C1.1. Thus, control is exerted so that the pixel capacitor for which coincidence of driving among the signal line, scanning line, and parity line occurs is selected and a voltage of the signal line is applied to the pixel capacitor.

In the TFT substrate shown in FIG. 17, only one scanning line is formed to correspond to one row of pixels and three parity lines are sequentially switched and driven so that the parity line P1 is turned ON in the first frame and the parity line P2 is turned ON in the second frame and the parity line P3 is turned ON in the third frame to apply each image voltage of the three signal lines d1, d2, and d3 to each of the pixel capacitors. Therefore, the same operations as performed when three scanning lines are formed to correspond to one row of pixels can be performed. Thus, in the active-matrix bistable display device of the third embodiment, by mounting the parity line driving circuit, even if a scale of the scanning-line driving circuit is made small, the same operations as performed in each of the above embodiments can be performed and, therefore, it is possible to reduce costs for manufacturing the active-matrix bistable display device.

It is apparent that the present invention is not limited to the above embodiments but may be changed and modified without departing from the scope and spirit of the invention. For example, in each of the above embodiments, as the display device, the QVGA-type electrophoretic display device having a pixel of 320 dots×240 dots is described, however, the present invention is not limited to this and configurations of pixels of the display device can be selected arbitrarily.

The active-matrix bistable display device of the present invention can be suitably used in display sections or a like of electronic papers, public displays, IC (Integrated Circuit) cards. Besides these, the active-matrix bistable display device may be used in various devices requiring display of a character and/or an image on a screen.

What is claimed is:

1. An active-matrix bistable display device comprising:

a bistable display panel having n pieces (n is an integer being two or more) of scanning lines extending in a row direction, n pieces of parity line groups each comprising X pieces (X is an integer being two or more) of parity lines extending in a row direction, corresponding to each of the n pieces of said scanning lines, M pieces (M is an integer being two or more) of signal lines extending in a column direction wherein nM pieces of pixel electrode are formed at intersections of the M pieces of said signal lines and the n pieces of said scanning lines and wherein a displaying state that changes by pixel electrode according to a voltage of said pixel to be applied to a facing electrode occurs;

a signal-line driving unit in which the M pieces of signal lines are sequentially divided into M/X pieces (M/X is an integer being two or more) of signal line groups each comprising X pieces of said signal lines and said signal line groups are connected to M/X pieces of terminals in a one-to-one relationship and image inputs corresponding to the M pieces of signal lines are sequentially divided into M/X pieces of image input groups each comprising X pieces of image inputs and X pieces of image signals making up each image input group are supplied sequentially to the M/X pieces of said terminals in a time-division manner;

a scanning-line driving unit to sequentially drive the n pieces of said scanning lines; and a parity-line driving unit to sequentially drive the X pieces of said parity lines;

wherein nM pieces of switching elements each connected between any one of said signal lines and any one of the corresponding pixel electrodes each are made active in response to simultaneously driving of the corresponding scanning lines and any one parity line belonging to the corresponding parity line group so as to supply an image voltage fed from each signal line to the corresponding pixel electrode so that bistable display by pixel in said display panel is performed according to a polarity of said image voltage.

2. The active-matrix bistable display device according to claim 1, wherein said scanning-line driving unit comprises shift registers in n pieces of stages provided so as to correspond to the n pieces of said scanning lines, wherein shift registers in each stage sequentially drive the n pieces of said scanning lines.

3. The active-matrix bistable display device according to claim 1, wherein said parity-line driving unit comprises shift registers in X piece of stages making up ring counters provided in a manner to correspond to the X pieces of the parity lines and wherein shift registers in each stage sequentially drive the X pieces of said parity lines.

4. The active-matrix bistable display device according to claim 1, wherein said signal lines, said scanning lines, parity lines, and said switching elements are placed in a lower portion of each of said pixel electrodes relative to said facing electrode.

5. The active-matrix bistable display device according to claim 1, wherein, during an image writing period, after writing of an image voltage applied to each of said pixel electrodes from signal lines is repeated during a plurality of frame periods, during an image holding period, a voltage of each of said signal lines and of each of said scanning lines is made to be at 0 (zero) volts or is made to be opened.

6. The active-matrix bistable display device according to claim 2, wherein said shift registers are bootstrap-type shift registers wherein start signals or outputs from shift registers in a previous stage are applied to input terminals of said shift registers and output signals from shift registers in a next stage are applied to reset terminals of said shift registers.

7. The active-matrix bistable display device according to claim 1, wherein said switching elements and shift registers are thin-film transistors made of amorphous silicon.

8. The active-matrix bistable display device according to claim 1, wherein said active-matrix bistable display device is made up of an electrophoretic display device.

* * * * *